(12) United States Patent
Hinkle

(10) Patent No.: US 8,676,123 B1
(45) Date of Patent: Mar. 18, 2014

(54) ESTABLISHING CONNECTION BETWEEN MOBILE DEVICES USING LIGHT

(71) Applicant: Evernote Corporation, Redwood City, CA (US)

(72) Inventor: Christopher Hinkle, Austin, TX (US)

(73) Assignee: Evernote Corporation, Redwood City, CA (US)

( * ) Notice: Subject to any disclaimer, the term of this patent is extended or adjusted under 35 U.S.C. 154(b) by 23 days.

(21) Appl. No.: 13/658,504

(22) Filed: Oct. 23, 2012

Related U.S. Application Data

(60) Provisional application No. 61/563,114, filed on Nov. 23, 2011, provisional application No. 61/621,196, filed on Apr. 6, 2012, provisional application No. 61/658,109, filed on Jun. 11, 2012.

(51) Int. Cl.
*H04B 7/00* (2006.01)
*H04M 3/42* (2006.01)

(52) U.S. Cl.
USPC ..................................... 455/41.2; 455/414.1

(58) Field of Classification Search
CPC ........... H04W 4/00; H04W 8/18; H04W 8/20; H04W 84/18
USPC ............. 455/41.2, 414.1, 414.2, 414.3, 414.4
See application file for complete search history.

(56) References Cited

U.S. PATENT DOCUMENTS

| | | | |
|---|---|---|---|
| 2002/0068600 A1* | 6/2002 | Chihara et al. ................. | 455/550 |
| 2005/0010768 A1* | 1/2005 | Light et al. ..................... | 713/168 |
| 2008/0132167 A1* | 6/2008 | Bent et al. ..................... | 455/41.2 |
| 2008/0209012 A1* | 8/2008 | Abujbara et al. ............. | 709/219 |
| 2010/0311330 A1* | 12/2010 | Aibara et al. ................. | 455/41.2 |
| 2011/0296508 A1* | 12/2011 | Os et al. ............................ | 726/7 |

* cited by examiner

*Primary Examiner* — Christopher M Brandt
(74) *Attorney, Agent, or Firm* — Muirhead and Saturnelli, LLC

(57) ABSTRACT

Establishing a connection between mobile devices includes arranging a first one of the mobile devices to display a sequence of images that are received by a second one of the mobile devices. The first one of the mobile devices displays a first sequence of images that are received by the second one of the mobile devices. The second one of the mobile devices displays a second sequence of images that are received by the first one of the mobile devices. The first and second sequences of images establish contact between the mobile devices. The mobile devices exchanging images to determine mutually available data transmission techniques following establishing contact between the mobile devices.

20 Claims, 18 Drawing Sheets

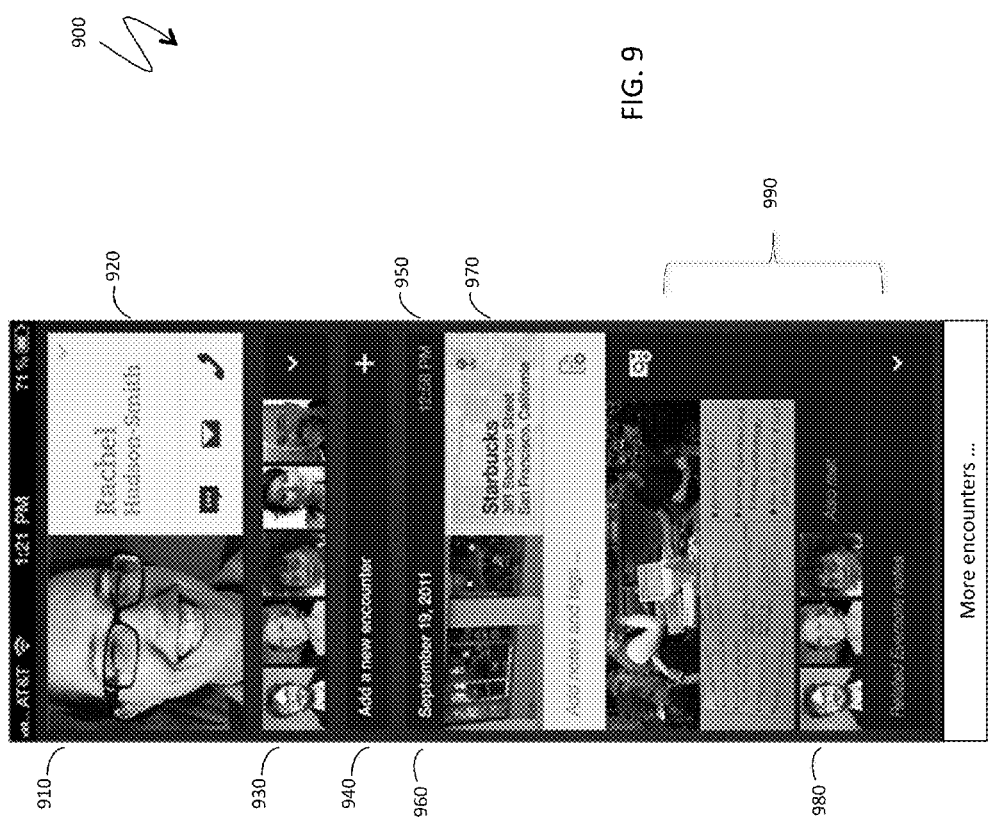

ESTABLISHING CONNECTION BETWEEN MOBILE DEVICES USING LIGHT

CROSS-REFERENCE TO RELATED APPLICATIONS

This application claims priority to U.S. Prov. App. No. 61/563,114, filed Nov. 23, 2011, and entitled "METHOD AND APPARATUS FOR BUILDING AND USING ENCOUNTER-DRIVEN PERSONAL DIGITAL MEMORY", which is incorporated herein by reference, and claims priority to U.S. Prov. App. No. 61/621,196, filed on Apr. 6, 2012 and entitled "METHOD AND PROCESS FOR DATA TRANSMISSION BETWEEN MOBILE DEVICES WITH FRONT-FACING CAMERAS USING VISIBLE LIGHT", which is incorporated herein by reference, and claims priority to U.S. Prov. App. No. 61/658,109, filed on Jun. 11, 2012 and entitled "METHOD AND SYSTEM FOR USING DECORATED AUDIO SEQUENCES AS DATA REFERENCES", which is incorporated herein by reference.

TECHNICAL FIELD

This application is directed to the field of analyzing, processing, presenting and communicating information.

BACKGROUND OF THE INVENTION

Today's solutions for contact management include contact lists in Personal Information Management (PIM) software, buddy lists, connections, contacts, friends, circles, aspects and other individual and group contact concepts present on desktops, mobile devices, as well as general purpose and professional networks. These solutions emphasize the existence and sometimes the category of connections between participants (such as former colleagues, doing business together, referred by third person, etc.). Available systems offer little tools and information helping understand the dynamics and history of relations between contacts, accompanying correspondence, recorded memories of participants in conjunction with their meetings, and mutual experiences of multiple connected participants. As a result, ties in social graphs and individual contact lists lack depth and quality. Additionally, an increasing number of people, who are meeting each other for the first time in a social environment, lack easy-to-use, secure, compelling and socially acceptable tools for exchanging personal information between their mobile devices. There is an increased demand to add social and personal context and dynamics to contact management and make them organic parts of overall personal content management. It should also be noted that members of social networks who are meeting each other in-person rarely need exchanging extensive amounts of personal contact information between them: once a key piece of such information, such as an email address, is known, the rest can normally be extracted from social networks such as LinkedIn, Facebook, etc.; adding such flexibility to personal contact management increases its efficiency.

Accordingly, it would be desirable to develop systems and tools for enriching personal contact management systems, combining them with broader personal content management systems, such as Evernote provided by Evernote Corporation of Redwood City, Calif., and for easy transmission and expansion of personal contact information between trusted individuals or groups of people. It is also desirable to find a mechanism to facilitate communication with personal devices that may be used with contact management systems and/or may be used generally to send and/or receive information.

SUMMARY OF THE INVENTION

According to the system described herein, managing contact information includes a first user identifying at least one other user in response to the first user encountering the at least one other user, the first user obtaining contact information from the at least one other user, where the contact information is transmitted to a mobile device of the first user, automatically supplementing the contact information from the at least one other user with additional information about at least one of: additional information about the at least one other user provided from outside the mobile device, a record of encounters between the first user and the at least one other user, and a record of other people present at encounters between the first user and the at least one other user, and storing, in a personal contact space of the first user, the contact information from the at least one other user and the additional information, wherein the personal contact space is provided by storage of the mobile device. The additional information may be extracted from a social network site. The social network site may be selected from the group consisting of: LinkedIn, Facebook, Tumblr, and Twitter. Managing contact information may also include the at least one other user obtaining contact information from the first user and automatically supplementing the contact information from the first user with additional information about at least one of: additional information about the at least one other user provided from outside the mobile device, a record of encounters between the first user and the at least one other user, and a record of other people present at encounters between the first user and the at least one other user. Managing contact information may also include synchronizing data between the personal contact space and cloud storage. The cloud storage may be selected from the group consisting of: Evernote, iCloud, Skydrive, Dropbox, Box.com, Google Drive, and Amazon S3. Obtaining contact information may include at least one of: direct entry into the mobile device, entering initial information into the mobile device that provides access to a social network site, performing optical character recognition on a business card to obtain initial information that provides access to a social network site, using email correspondence to obtain initial information that provides access to a social network site, and semi-automatic wireless exchange of contact information. The wireless exchange may be provided by one of: directly transmitting data between mobile devices, temporarily posting data to a server and then downloading the data from the server, and posting data to a server and then providing access to one or more online locations on the server that contain the data. The encounter may be one of: an in-person encounter or a virtual encounter. Managing contact information may also include optimizing a camera angle of the mobile device to take facial photographs using the mobile device. Optimizing a camera angle may include providing messages inviting a user to adjust an angle of the mobile device and then take a photograph once the angle is in an acceptable range.

According further to the system described herein, presenting a primary electronic contact entry for a particular person includes presenting visual information about the particular person and presenting visual information about other people described in other electronic contact entries, where the other electronic contact entries correspond to people having a relationship with the particular person. The visual information about the particular person and the visual information about other people may be provided at the same time. The visual information may include photographs of the particular person and the other people. Each of the photographs of the other people may vary in size according to at least one of: a number of encounters with the particular person and importance of prior encounters with the particular person.

According further to the system described herein, presenting a primary electronic contact entry for a particular person includes presenting visual information about the particular person and presenting visual information about previous encounters with the particular person. The visual information about previous encounters may include photographs of people and places corresponding to the previous encounters. The visual information about previous encounters may also include notes, documents, emails, calendar entries and other information associated with the previous encounters. The visual information about previous encounters may be filtered using keyword. The visual information about previous encounters may be ordered chronologically.

According further to the system described herein, computer software, provided in a non-transitory computer-readable medium, manages contact information. The software includes executable code that transmits contact information to a first user from at least one other user, wherein the contact information is transmitted to a mobile device of the first user, executable code that automatically supplements the contact information from the at least one other user with additional information about at least one of: additional information about the at least one other user provided from outside the mobile device, a record of encounters between the first user and the at least one other user, and a record of other people present at encounters between the first user and the at least one other user, and executable code that stores, in a personal contact space of the first user, the contact information from the at least one other user and the additional information, wherein the personal contact space is provided by storage of the mobile device. The additional information may be extracted from a social network site. The social network site may be selected from the group consisting of: LinkedIn, Facebook, Tumblr, and Twitter. The software may also include executable code that obtains contact information from the first user and executable code that automatically supplements the contact information from the first user with additional information about at least one of: additional information about the at least one other user provided from outside the mobile device, a record of encounters between the first user and the at least one other user, and a record of other people present at encounters between the first user and the at least one other user. The software may also include executable code that synchronizes data between the personal contact space and cloud storage. The cloud storage may be selected from the group consisting of: Evernote, iCloud, Skydrive, Dropbox, Box.com, Google Drive, and Amazon S3. The executable code that obtains contact information may include executable code that facilitates at least one of: direct entry into the mobile device, entering initial information into the mobile device that provides access to a social network site, performing optical character recognition on a business card to obtain initial information that provides access to a social network site, using email correspondence to obtain initial information that provides access to a social network site, and semi-automatic wireless exchange of contact information. The executable code may provide wireless exchange by one of: directly transmitting data between mobile devices, temporarily posting data to a server and then downloading the data from the server, and posting data to a server and then providing access to one or more online locations on the server that contain the data. The encounter may be one of: an in-person encounter or a virtual encounter. The software may also include executable code that optimizes a camera angle of the mobile device to take facial photographs using the mobile device. Executable code that optimizes a camera angle may provide messages inviting a user to adjust an angle of the mobile device and then take a photograph once the angle is in an acceptable range.

According further to the system described herein, computer software, provided in a non-transitory computer-readable medium, presents a primary electronic contact entry for a particular person. The software includes executable code that presents visual information about the particular person and executable code that presents visual information about other people described in other electronic contact entries, wherein the other electronic contact entries correspond to people having a relationship with the particular person. The visual information about the particular person and the visual information about other people may be provided at the same time. The visual information may include photographs of the particular person and the other people. Each of the photographs of the other people may vary in size according to at least one of: a number of encounters with the particular person and importance of prior encounters with the particular person.

According further to the system described herein, computer software, provided in a non-transitory computer readable medium, presents a primary electronic contact entry for a particular person. The software includes executable code that presents visual information about the particular person and executable code that presents visual information about previous encounters with the particular person. The visual information about previous encounters may include photographs of people and places corresponding to the previous encounters. The visual information about previous encounters may also include notes, documents, emails, calendar entries and other information associated with the previous encounters. The visual information about previous encounters may be filtered using a keyword. The visual information about previous encounters may be ordered chronologically.

According further to the system described herein, establishing a connection between mobile devices includes arranging a first one of the mobile devices to display a sequence of images that are received by a second one of the mobile devices, the first one of the mobile devices displaying a first sequence of images that are received by the second one of the mobile devices, the second one of the mobile devices displaying a second sequence of images that are received by the first one of the mobile devices, where the first and second sequences of images establish contact between the mobile devices, retrying to establish contact between the mobile devices in response to at least one of: the second one of the mobile devices not decoding the first sequence of images and the first one of the mobile devices not decoding the second sequence of images, the mobile devices exchanging images to determine mutually available data transmission techniques following establishing contact between the mobile devices, choosing one of the mutually available data transmission techniques, the mobile devices exchanging images to pair the mobile devices in response to the mobile devices not being previously authenticated to use the one of the mutually available transmission techniques that is chosen, and transferring data between the mobile devices using the one of the mutually available transmission techniques that is chosen. The one of the mutually available transmission techniques that is chosen may be one of: Bluetooth and Wi-Fi. The mobile devices exchanging images to pair the mobile devices may include providing images corresponding to numbers used in connection with a Secure Simple Pairing mechanism. The one of the mutually available transmission techniques that is chosen may be exchanging and interpreting images encoded with data for transmission. In response to the mobile devices not being able to be authenticated to use the one of the mutually available transmission techniques that is chosen, a different one of the mutually available transmission techniques may be chosen. Arranging a first one of the mobile devices to display a sequence of images that are received by a second one of the mobile devices may include placing the mobile devices face to face and the mobile devices may have front facing cameras that receive images displayed on an opposing one of the devices. The sequences of images may be made aesthetically attractive. Aesthetic attractiveness of the sequences of images may be enhanced by decorating the light signals with at least one of: color and animation. The sequences of images may include at least one video clip. A user may choose a specific set of image sequences from a library of sets of images. The system may capture and process images of a place where data transmission is performed and may choose a corresponding set of image sequences from a library of sets of images.

According further to the system described herein, computer software, provided in a non-transitory computer-readable medium, establishes a connection between mobile devices. The software includes executable code that causes a first one of the mobile devices to display a first sequence of images that are received by a second one of the mobile devices, executable code that causes a second one of the mobile devices to display a second sequence of images that are received by the first one of the mobile devices, wherein the first and second sequences of images establish contact between the mobile devices, executable code that retries to establish contact between the mobile devices in response to at least one of: the second one of the mobile devices not decoding the first sequence of images and the first one of the mobile devices not decoding the second sequence of images, executable code that causes the mobile devices to exchange images to determine mutually available data transmission techniques following establishing contact between the mobile devices, executable code that facilitates choosing one of the mutually available data transmission techniques, executable code that causes the mobile devices to exchange images to pair the mobile devices in response to the mobile devices not being previously authenticated to use the one of the mutually available transmission techniques that is chosen, and executable code that transfers data between the mobile devices using the one of the mutually available transmission techniques that is chosen. The one of the mutually available transmission techniques that is chosen may be one of: Bluetooth and Wi-Fi. The mobile devices exchanging images to pair the mobile devices may include providing images corresponding to numbers used in connection with a Secure Simple Pairing mechanism. The one of the mutually available transmission techniques that is chosen may be exchanging and interpreting images encoded with data for transmission. In response to the mobile devices not being able to be authenticated to use the one of the mutually available transmission techniques that is chosen, a different one of the mutually available transmission techniques may be chosen. The sequences of images may be made aesthetically attractive. Aesthetic attractiveness of the sequences of images may be enhanced by decorating the light signals with at least one of: color and animation. The sequences of images may include at least one video clip. The system may capture and process images of a place where data transmission is performed and may choose a corresponding set of image sequences from a library of sets of images.

According further to the system described herein, communicating using sound includes choosing a musical genre, encoding data by selecting musical chords from a chord alphabet, where different musical chords from the chord alphabet represent different symbols from the data alphabet decodable by a receiver and wherein musical chords that are used for the chord alphabet are provided according to the musical genre that is chosen, constructing a tune using the musical chords selected in connection with encoding data, and playing the tune to a receiver. A transmitter may play the tune to the receiver and one of: the receiver and the transmitter may be a mobile device. A receiver may require authentication to decode received data. Constructing the tune may include adding filler chords that do not encode any data and cause the tune to be more aesthetically pleasing. The filler chords may be selected using a Markov model of expected chord progressions in music of the musical genre that is selected. Communicating using sound may also include adding delimiter chords that separate the filler chords from musical chords that encode data, where the delimiter chords delimit a sequence of filler chords without encoding any data. The tune may include an introduction part, a data fragment part, and a checksum part and the delimiter chords may be used to separate the parts. Constructing the tune may include overlaying a melody corresponding to the musical genre that is selected. A user may select at least one of: the melody and the musical genre. The data may correspond to a Web site URL. The data may be obtained using a URL shortening service.

According further to the system described herein, computer software, provided in a non-transitory computer-readable medium, communicates using sound. The software includes executable code that encodes data by selecting musical chords from a chord alphabet, where different musical chords from the chord alphabet represent different symbols from the data alphabet decodable by a receiver and wherein musical chords that are used for the chord alphabet are provided according to a musical genre that is chosen, executable code that constructs a tune using the musical chords selected in connection with encoding data, an executable code that plays the tune to a receiver. A transmitter may play the tune to the receiver and one of: the receiver and the transmitter may be a mobile device. A receiver may require authentication to decode received data. Executable code that constructs the tune may include executable code that adds filler chords that do not encode any data and cause the tune to be more aesthetically pleasing. Executable code that constructs the tune may select the filler chords using a Markov model of expected chord progressions in music of the musical genre that is selected. The software may also include executable code that adds delimiter chords that separate the filler chords from musical chords that encode data, where the delimiter chords delimit a sequence of filler chords without encoding any data. The tune may include an introduction part, a data fragment part, and a checksum part and where the delimiter chords may be used to separate the parts. Executable code that constructs the tune may include executable code that overlays a melody corresponding to the musical genre that is selected. A user may select at least one of: the melody and the musical genre. The data may correspond to a Web site URL. The data may be obtained using a URL shortening service.

Managing personal contact information may be based on several notions: an encounter, a contact profile and a personal contact space. An encounter is a communications session that includes two or more participants and has a mutual theme shared by participants. Examples are an in-person meeting, an audio/video conference, a chat session, an email message received within a correspondence thread; etc. Any content recorded by meeting participants and shared between the participants may belong to the encounter and so does the content that has been captured during an encounter or associated with such encounter by each participant who is looking to include the encounter into the personal contact space (an owner of personal contact space). Captured content may include notes, photos, audio and video clips taken during an encounter; associated content may include Web references or pages, documents, past notes, etc. that have been selected by participants as a relevant content for an encounter. The combination of all encounters, contacts and related content constitutes a personal contact space of the owner thereof. Querying the personal contact space for a particular contact reveals a contact profile—the timeline of encounters where that contact participates, including places, other associated contacts who participated in the encounters, and any accompanying materials. The set of contact profiles enables owners to take a deeper look into their own memories and to recall important socialization events and related people. For example, an owner of personal contact space may retrieve forgotten contact information implicitly, by recalling an encounter with another, better memorized person where the desired contact information was captured.

From the standpoint of a personal contact space of an owner, each encounter may include both existing and new contacts as the participants thereof. Accordingly, multiple techniques for capturing and sharing contact information by and with participants of an encounter may be provided. In one embodiment, owners pass on their mobile devices with a blank personal contact form displayed on device screens to other participants who can them type in their personal information into the form, take personal photos on owner's device to add it to their contact info, as explained elsewhere herein; etc. In another embodiment, participants may type in only a key portion of their information, such as an email address, into an owner's copy of contact form; after that, the system logs in to social networks, such as LinkedIn, Facebook, Tumblr, or Twitter and retrieves the rest of participants' contact information, including photos, from such networks. Prior to retrieving participants' contact information from social networks, owners or participants may take photos of participants' business cards, which are then processed by the system for automatic optical character recognition (OCR) in order to retrieve the most important information from such cards, email address and name, and feed the retrieval mechanism as explained above. In yet another embodiment, the system extracts email addresses or other significant identifiers of participants from an email thread and subsequently may retrieve, by owner's request, additional contact information of participants who have not previously been included in owner's personal contact space or whose info, in owner's opinion, may need upgrading, from social networks. In another embodiment, during an in-person encounter, the system may identify the presence of participants in one place using location-aware technology such as GPS; the system may then offer each participant (as an owner) exchanging contact information stored online in their own personal contact spaces, which may be part of a broader personal information management system such as Evernote. Transferring contact information from personal online accounts may require additional authorization, such as peer-to-peer or group handshaking or permission to decode an encoded broadcast communication by recipient mobile devices, as explained elsewhere herein.

For participants of in-person encounters who carry mobile phones equipped with front-facing cameras, connection between phones for the purpose of data transmission (handshaking) can be established using visible light emitted by phone screens and received by front-facing cameras. In case other data transmission methods are not available, unreliable or overloaded, visible light may also be used to transmit the actual data between phones. The participants position their phones screen-to-screen at a close distance. The system then displays sequences of visual patterns on each phone screen representing, in encoded form, various parameters necessary for establishing connection between phones, in order to eliminate manual preparations of phones to data transmission often required by data transmission software. Each recipient phone reads visual signals using its front facing camera; parameters are deciphered and processes as necessary to establish connection between the phones. In different embodiments and depending on types of wireless connectivity available on both phones, protocols, intermediate software applications controlling over data transfer, and procedures of establishing connections under such conditions, the system may automate different sequences of user actions using visible light as connectivity data transport. In one embodiment with Bluetooth connectivity and the Secure Simple Pairing (SSP) mechanism, visible light emitted by devices and received by front-facing cameras transmits, through visual patterns, numeric code, used in authentication method based on numeric comparison, and then confirms, on behalf of device owners, authenticity of transmitted codes. In another embodiment with the SSP mechanism, visible light signals represent passcodes and establish SSP pairing during a similar procedure where the passcode is decoded from generated visual sequence by front-facing camera of another phone. In yet another embodiment, encoded visual patterns are used to create a link key stored in the encrypted form on both phones and enabling easy pairing and data transfer between them.

Key contact data such as email addresses can be transmitted via brief decorated audio sequences where a background melody is mixed with accompanying chords, which represent transmitted data and additional filler chords serving decorative purpose. A phone or other mobile device of a sender encodes transmitted data and plays the chords as part of a brief tune. A receiving entity may be any connected device with microphones or other audio reception capabilities, which runs decoding and interpreting software. The system is capable of deciphering received audio signals but may need a handshaking process between the transmitting device and the recipient devices to allow deciphering. Accordingly, recipient devices may also play brief tunes to identify themselves and obtain the permission and possibly a public encryption key to decode the original audio sequence; the permission and, optionally, the key are sent by the system in another tune from the transmitting device (or by executing other handshaking protocol).

Optimal capturing of personal photos by new contacts during an in-person encounter is provided. The optimal capturing is applicable to many models of mobile phones equipped with a gyroscopic or other auto-detection system measuring device tilt and may be used in a situation where owners pass on their mobile phones to other participants of a real encounter and request for taking participants' personal photos as part of their contact information. When such new contact is given the device with a front-facing camera, that individual looks at the screen holding the smartphone. Phone tilt defines the camera angle against the axis orthogonal to phone surface and centered in the middle point of contact's face. The best angle for quality facial photos is when the phone is held slightly above the face and tilted down. Accordingly, a contact capturing feature of the system monitors the current tilt of the phone and recommends taking the shot when the angle is right.

An owner of a personal contact space may visualize such space using two key views: a contact view, (people mosaic), and a profile view built for a particular contact profile, as explained elsewhere herein. The contact view is a chronological view of contact photo thumbnails grouped by encounters; it includes photos of individual contacts or their basic contact information (when the photos have not been captured), along with dates of encounters. A size of a thumbnail depends on the amount of contact information and content available for a contact. Similarly, dates of encounters are displayed in boxes of different size; monthly calendar delimiters are used for encounters with small numbers of participants. When many people (for example, more than five) have met in the real world within a short timeframe of two-three days and in the same location, such gatherings are marked with a special status and acquire large date boxes that include month, start date, and location of an encounter. With such a display procedure, the contact view provides instant visual clues on key people and encounters. The profile view includes a summary and a chronological view of encounters with details on each encounter built for a particular contact. The summary section lists available contact information and the list of associated contacts—all other participants of encounters whom owner has met there together with the contact. The list of encounters included in the contact profile lists all encounters with their time and location info, associated contacts, and associated content captured during encounters, such as photos, video and audio clips, handwritten and typed notes, emails, files, etc.

An owner may perform different actions in connection with the information present in owner's personal contact space. Examples of such actions include: exploring personal profiles of contacts; automatically initiating communications with contacts and groups of contacts, such as phone call, email, online conference or other communication methods; relating broader content to contacts, including direct and semantic search in owner's personal content databases or in public sources; etc.

Personal contact space of an owner may be stored locally and such local storage may be periodically synchronized with an online storage, which makes it available on different devices. In particular, encounters, contacts and the whole personal contact space may be included in the Evernote personal content database.

BRIEF DESCRIPTION OF THE DRAWINGS

Embodiments of the system described herein will now be explained in more detail in accordance with the figures of the drawings, which are briefly described as follows.

FIGS. 8A-8C illustrate a user interface for the contact view of a personal contact space according to an embodiment of the system described herein.

FIG. 9 is an illustration of a user interface for the profile view of a personal contact space according to an embodiment of the system described herein.

DETAILED DESCRIPTION OF VARIOUS EMBODIMENTS

The system described herein provides a mechanism for capturing encounters and contact information and for building, storing, synchronizing, viewing, utilizing and maintaining personal contact space and contact profiles. The system provides different techniques for capturing contact information, as explained elsewhere herein; in particular, the system provides techniques for optimizing camera angle while capturing contact photo by an individual; for transmitting contact information using decorated audio sequences broadcasted and received by mobile devices of participants of an encounter; and for transmitting contact information between mobile devices with front facing cameras using visible light emitted by phone screens. The system replaces a traditional view of contacts as a list of isolated individuals with an encounter-driven view of a personal contact space where each contact appears in the context of an activity stream, other people are playing their roles, in-person and virtual meetings are taking place, and different types of content are circulating between participants.

Figure 1:
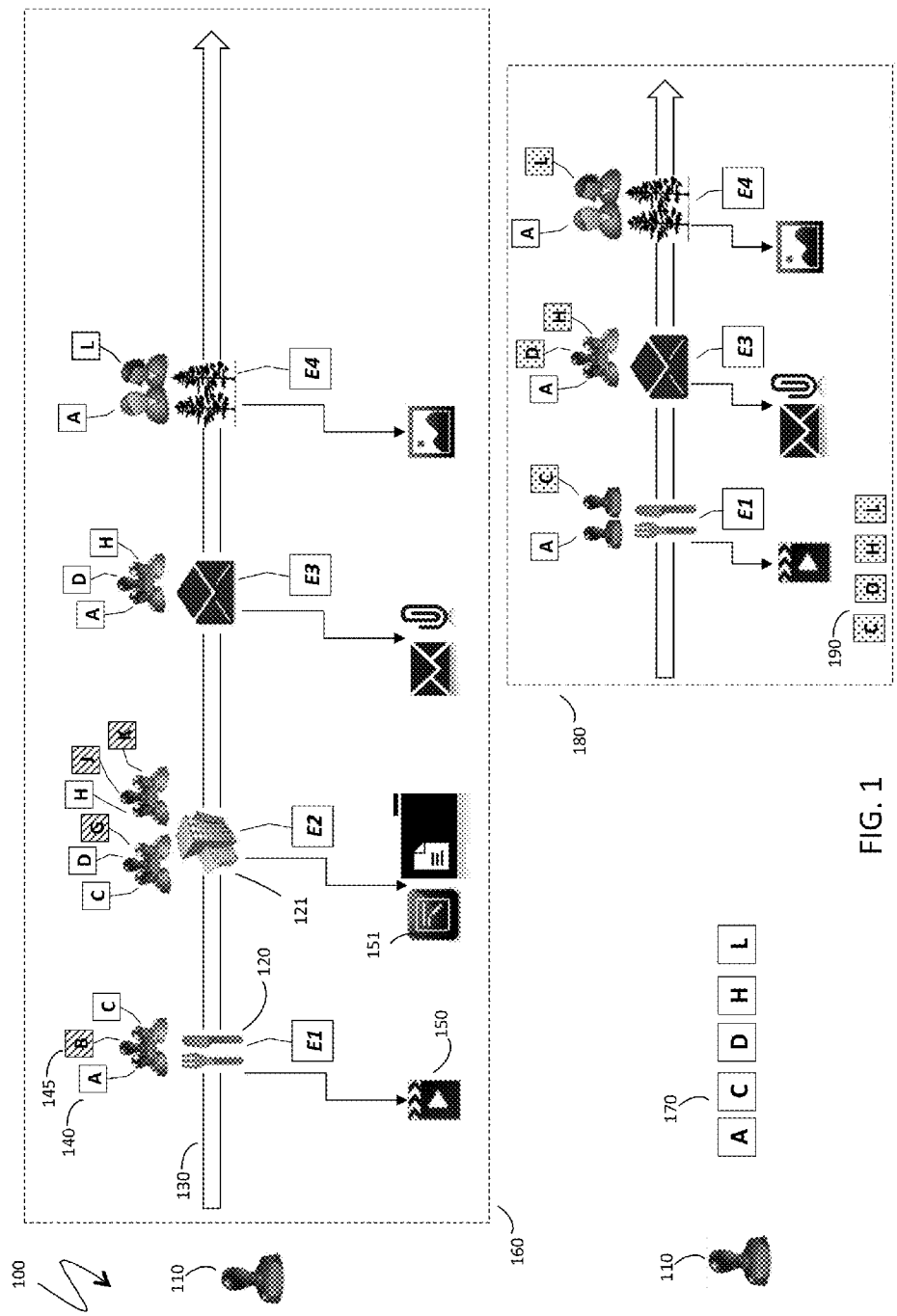
FIG. 1 is a schematic illustration of different types of encounters arranged on a timeline, contacts, and associated materials according an embodiment of to the system described herein.

FIG. 1 is a schematic illustration 100 of encounters, personal contact space, contact lists, and contact profiles. An owner 110, whose personal contact space is illustrated in FIG. 1, participates in multiple encounters 120, 121 exemplified and marked by labels E1, E2, etc., and arranged chronologically on a timeline 130. Each encounter has its own list of participants exemplified and marked by letters A, B, . . . L in squares about participant icons. For each participant their contact information may either be captured or left abandoned by the owner. Captured contact information is denoted by clear boxes 140 and similar and abandoned contacts are denoted by filled boxes 145 and similar. Additionally, for each encounter, associated materials 150, 151 may be captured, including video clips, handwritten notes, documents, emails and corresponding attachments, photos, etc. The combination of all encounters where each encounter includes captured contact information and associated materials constitutes the personal contact space 160 of its owner. In an example shown in FIG. 1, a full list 170 of contacts of an owner includes five individuals. In particular, a sample contact profile 180 of the contact "A", which may be automatically built for the owner, includes three of the four encounters, represented on FIG. 1, and has four associated contacts 190 participating in some of the encounters.

Figure 2:
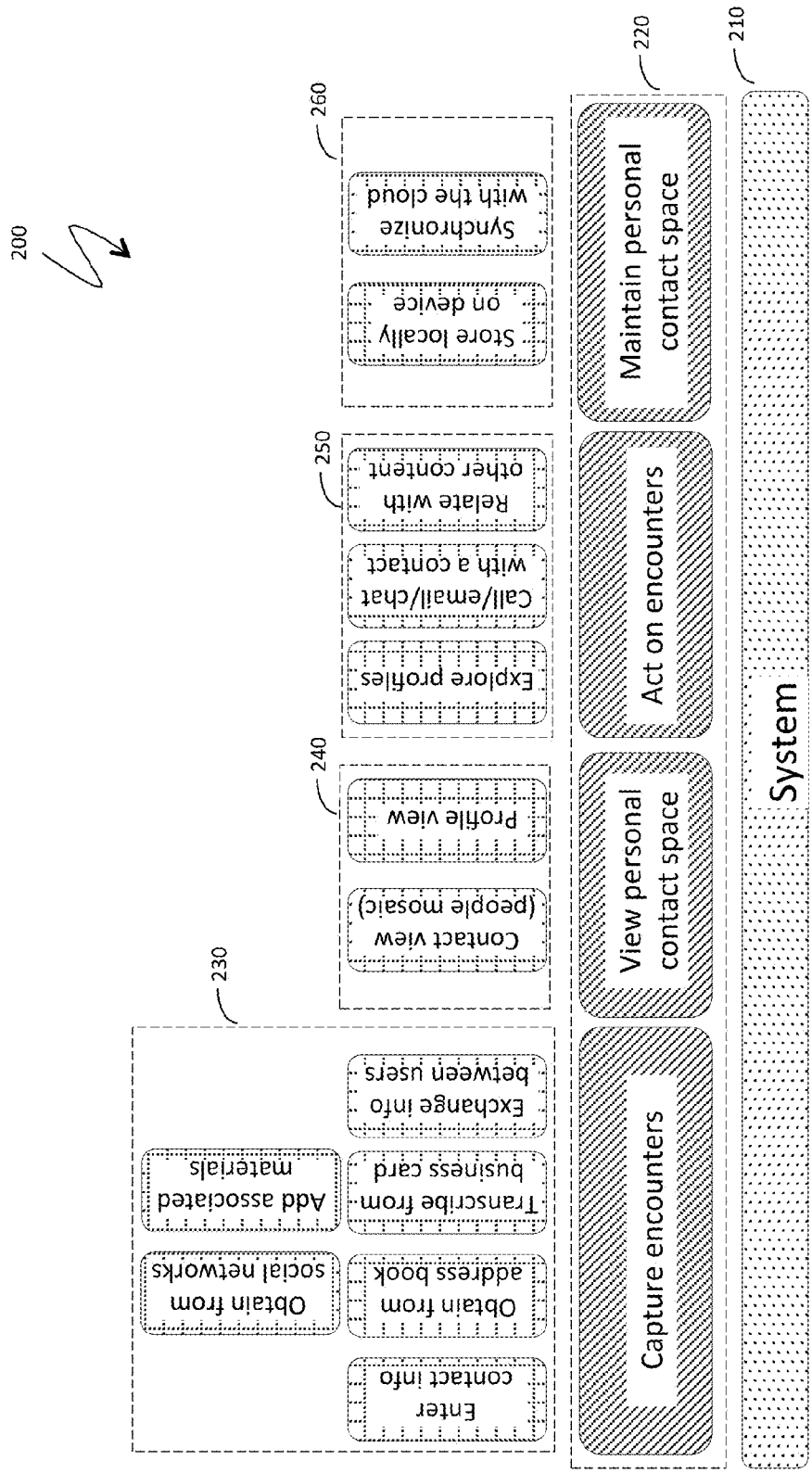
FIG. 2 is a system architecture chart, including two levels of functional components according to an embodiment of the system described herein.

FIG. 2 is a schematic illustration 200 of architecture of the system described herein. The system 210 includes four principal subsystems 220: a subsystem for capturing encounters and forming personal contact space; a subsystem for viewing personal contact space (explained elsewhere herein); a subsystem for performing actions on encounters and personal contact space; and a subsystem for maintaining personal contact space. Furthermore, the subsystem for capturing encounters includes six components 230: a first component for entering contact information, a second component for obtaining such information from address books, a third component for transcribing key contact information from business cards via Optical Character Recognition (OCR), a fourth component for wirelessly exchanging contact information between participants of an encounter, a fifth component for obtaining additional contact information from social networks, and a sixth component for adding associated materials for an encounter. Capturing contact information is explained in more details elsewhere herein.

The subsystem for viewing personal contact space includes two components-views 240, a contact view, or people mosaic, and a profile view, illustrated in FIG. 1 and further explained elsewhere herein. The subsystem for performing actions on encounters includes three components 250, namely, a component for exploring contact profiles, a component for communicating by personal space owner with contacts via voice call, email, chat and other means, and a component for building related content from a broader context, such as personal content database of owner or public sources, including web search. The subsystem for maintaining personal contact space includes two key components 260: a first component that stores the space locally on owner's mobile device and a second component that periodically synchronizes the space with the cloud for network storage and for the anytime/anywhere accessibility of the personal contact space from owner's other connected devices.

Figure 3:
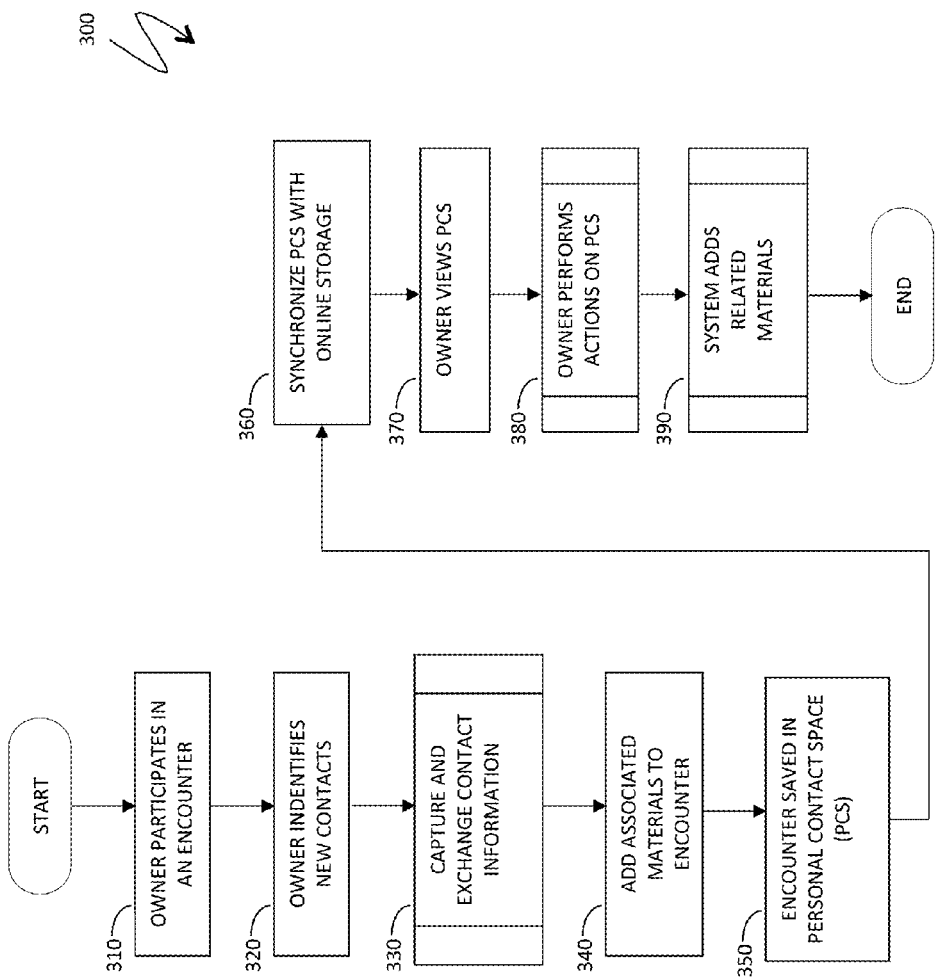
FIG. 3 is a general system flow diagram illustrating processing occurring in connection with an encounter between an owner and one or more participants according to an embodiment of the system described herein.

Referring to FIG. 3, a flow diagram 300 illustrates system functioning and shows the place in the system workflow of each component of the system architecture described elsewhere herein. Processing begins at a step 310 where the owner participates in an encounter. Following the step 310 is a step 320 where the owner identifies a new contact whose contact information is desirable to capture and for exchange with information of the owner. Following the step 320 is a step 330 where the owner and other participants of the encounter capture each other's contact information or exchange contact information using automatic or semi-automatic means, as explained in more detail elsewhere herein. After the step 330, processing proceeds to a step 340, where the owner and participants may add associated materials to an encounter.

It should be noted that both the step 330 and the step 340 may be "asymmetrical": an owner may capture contact information of a participant of the encounter who may not reciprocate by capturing information of the owner for a variety of reasons, including the absence of installed system on participant's mobile device. Similarly, associated materials captured by the owner and other participants may substantially differ; for example, some of the participants may be taking photos, recording video and/or audio clips, notes, and documents that may be selectively available only to a limited subset of participants or even only to the author of the material.

After the step 340, processing proceeds to a step 350, where the encounter is saved in personal contact space of the owner and possibly in similar spaces of some of the participants who have a system installed on their mobile devices. As explained above, the owner and each participant may have substantially different versions of the encounter where the only common information may be the time stamp and location of the encounter. Note that, in some cases, even the time stamps may be different since it is possible to have a virtual encounter such as an online conference where participants may all be in different locations and time zones and may arrive to the conference at different times.

After the step 350, processing proceeds to a step 360, which is performed periodically, possibly according to system settings of each owner. At the step 360, the system synchronizes the updated personal contact space with cloud storage and also possibly with a corresponding online service (such as Evernote, iCloud, Skydrive, Dropbox, Box.com, Google Drive, or Amazon S3 or system's own version of the cloud service). The new encounter may be included in the personal contact space of the owner (and of each participant who has recorded any information about the encounter) and is available for viewing and acting upon. After the step 360, processing proceeds to a step 370, where the owner views personal contact space either in the contact view or in the profile view, as explained in more detail elsewhere herein. After the step 370, processing proceeds to a step 380, where the owner performs different actions on the personal contact space, which may include exploring contact profiles, communicating with contacts, relating additional content to encounters, etc. It should be noted that steps 370, 380 are interchangeable and each of the steps 370, 380 is optional. After the step 380, processing proceeds to a step 390, where optionally the system automatically expands personal contact space (in addition to expansion provided as a result of demand by the user at the step 380) by adding related materials to encounters as a result of updated personal contact space or other personal content databases of the owner. Following the step 390, processing is complete.

Different techniques for capturing contact information may be available and utilized depending upon the type of an encounter (i.e., in-person or virtual), available mobile and other devices, owner and participants' relations and attitude, and other factors. The goal of easy and instant hands-free exchange of contact information should be balanced with considerations of security, mutual trust and available technical means.

Figure 4:
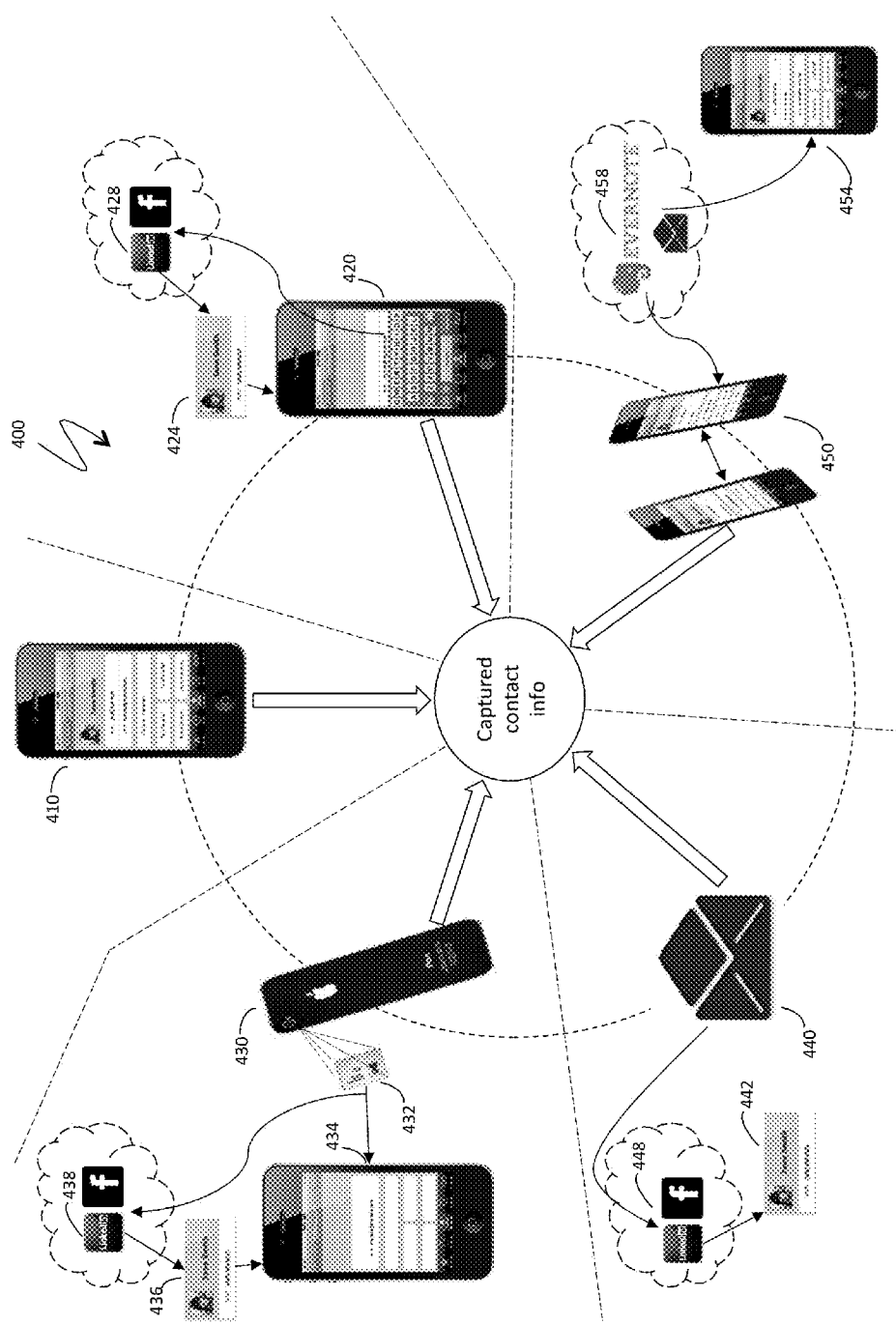
FIG. 4 is a schematic illustration of different techniques for capturing contact information according to an embodiment of the system described herein.

Referring to FIG. 4, a schematic illustration 400 shows five different mechanisms for capturing contact information in real and virtual encounters. A first mechanism 410 illustrates conventional direct typing of contact information into a mobile or other device by the owner or by the contact, supplemented with taking a photo of the contact. This mechanism of manually obtaining full contact information may be the most time consuming and error-prone but still cannot be excluded for certain types of encounters. A second mechanism starts with typing in only an initial piece of contact information, such as an email 420, into a contact form of the owner. After that, the system running on a connected mobile device of the owner automatically logs into a social network site (SNS), such as, for example, a professional network 428 like the LinkedIn professional network, and obtains full information 424 of a contact, if available, from such SNS using a site's integration capabilities and permissions.

A third mechanism is a modification of the second mechanism where initial contact information is not entered manually but rather is retrieved from a business card 432 of a contact, which is photographed by the owner on the mobile device 430 and transcribed into a contact field 434 using an image processing system with an OCR component. Concurrently, the transcribed initial contact information (verified by the contact) is submitted to an SNS, and the rest of the full contact information retrieval is obtained at two different operations 436, 438 in a manner that is similar to operations described above in connection with the information 424 and the professional network 428. A fourth mechanism is another modification of the second mechanism utilizing SNS integration. The fourth mechanism corresponds to a virtual encounter where the initial contact information 440 is obtained from an email correspondence or other messaging or online conference session. Subsequently, logging into SNS retrieves full contact information 442 at a step 448, which is subsequently recorded in a copy of the encounter of the owner. A fifth mechanism involves semi-automatic wireless exchange of contact information between mobile devices of the owner and participant(s). According to this mechanism, mobile devices 450, 454, located in sufficient proximity, detect mutual presence and the system initiates a communications session informing each device of available new contacts nearby. After notifying about an intent to exchange contact information, the devices may authenticate each other using any available mechanisms, some of which are explained elsewhere herein. Mutually authenticated devices may exchange or transmit one-way contact information using either peer-to-peer connections 450 such as NFC, Bluetooth or Wi-Fi (when all devices are on the same network) or, alternatively, by utilizing server-based information 458 such as emailing contact information to authorized devices 454 or pulling information from the cloud where their contact information may be stored in personal contact space and/or other online services such as Evernote.

Figure 5A:
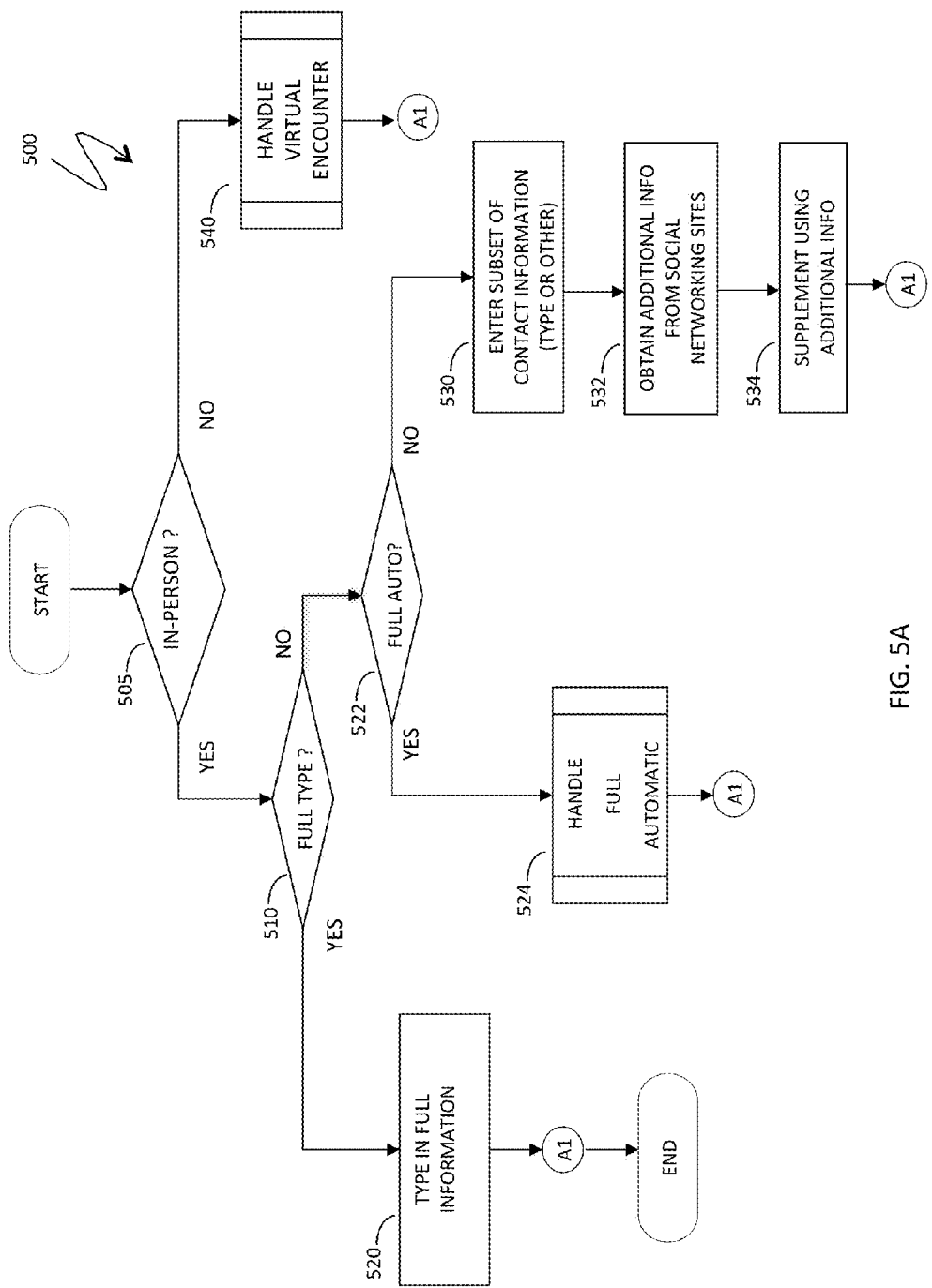
FIGS. 5A-5C are flow diagrams showing capturing contact information according to an embodiment of the system described herein.

Referring to FIG. 5A, a flow diagram 500 illustrates an owner capturing contact data of one or more participant(s). The contact data is about the participant(s) and is being transferred to and stored by the owner. Note that, although the discussion herein mentions transferring contact data from the participant(s) to the owner, in some cases, the owner may become a participant in transferring contact data to a different owner. In some cases, the exchanges may be simultaneous so that a first user may be an owner receiving content from a second user that is a participant while, at the same time, the first user is a participant transferring content to the second user acting as an owner.

Processing for the flow diagram 500 starts at a test step 505 where the type of the current encounter (in-person or virtual) is detected. Note, by the way, that it is possible to have a hybrid meeting where some of the encounters are virtual while others of the encounters are in-person. If it is determined at the step 505 that the encounter is an in-person meeting between the owner and the participant(s), then processing proceeds to a test step 510 where it is determined if the chosen technique for entering contact information is typing in full contact information (i.e., manually typing in all of the contact information). If so, then processing proceeds to a step 520 where the full contact information is manually entered, either by the owner or by the participant. Following the step 520, processing is complete.

If it is determined at the test step 510 that the chosen technique for entering contact information is not typing in full contact information, then control transfers from the test step 510 to a test step 522 where it is determined if the chosen technique is fully automatic where all or at least most of the contact information is electronically exchanged between devices of the owner and the participant(s). If so, then control transfers from the test step 522 to a step 524 where the automatic transfer of contact information is performed. Processing provided at the step 524 is described in more detail elsewhere herein. Following the step 524, processing is complete.

If it is determined at the test step 522 that the chosen technique for transferring contact information is not fully automatic, then control transfers from the test step 522 to a step 530 where a subset of contact information is entered, either by manual entry (typing) or by an automatic exchange using electronic signals, sound, or light, as described in more detail elsewhere herein. The subset of contact information entered at the step 530 may include a name, a name and email address, or some other identifying information that may be used to obtain further information from social networking sites or similar, as described in more detail elsewhere herein. It is also possible at the step 530 to obtain the information by first taking a photograph of a business card of a participant using a mobile device equipped with a camera (e.g., a smartphone) and then parsing the captured image and performing targeted OCR aimed at retrieving the subset of contact information from the image of the business card, which may then be visually verified.

After the step 530, processing proceeds to a step 532 where the system submits the subset of contact information to a social networking site (or a series of sites) to retrieve additional contact information. After the step 532, processing proceeds to a step 534 where the contact information of the participant(s) is augmented with the additional information obtained from the social networking site. Following the step 534, processing is complete.

If it is determined at the test step 505 that the encounter is virtual (not in-person), such as an online conference or an email correspondence, then processing proceeds to a step 540 where the virtual encounter is handled. Handling the virtual encounter at the step 540 is described in more detail elsewhere herein. Following the step 540, processing is complete.

Figure 5C:
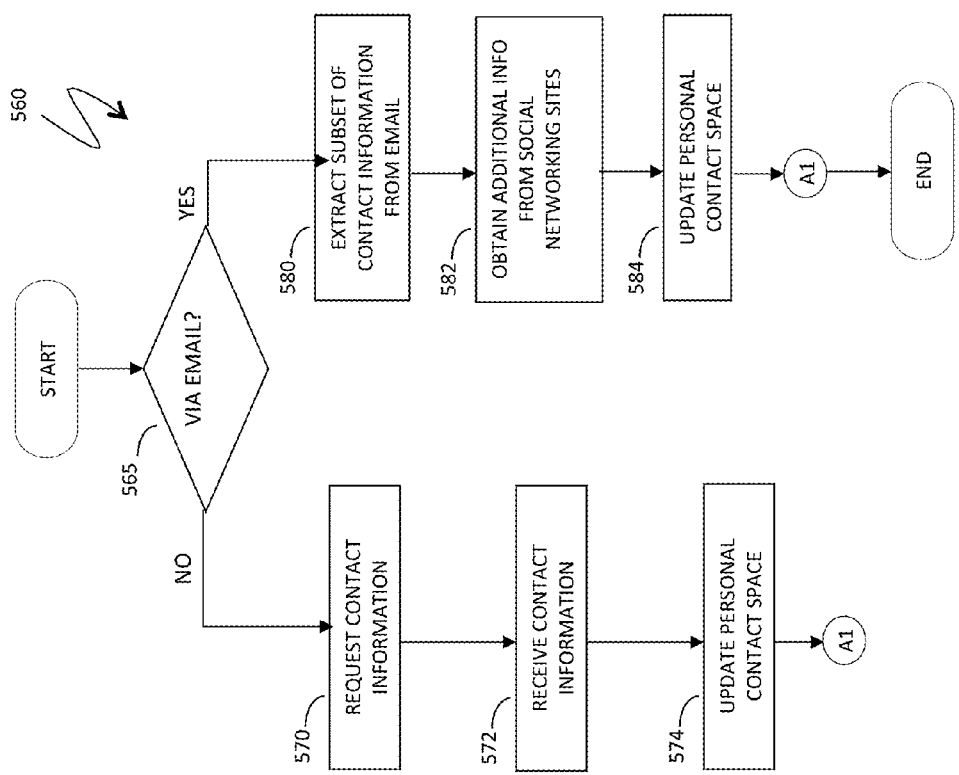
Figure 5B:
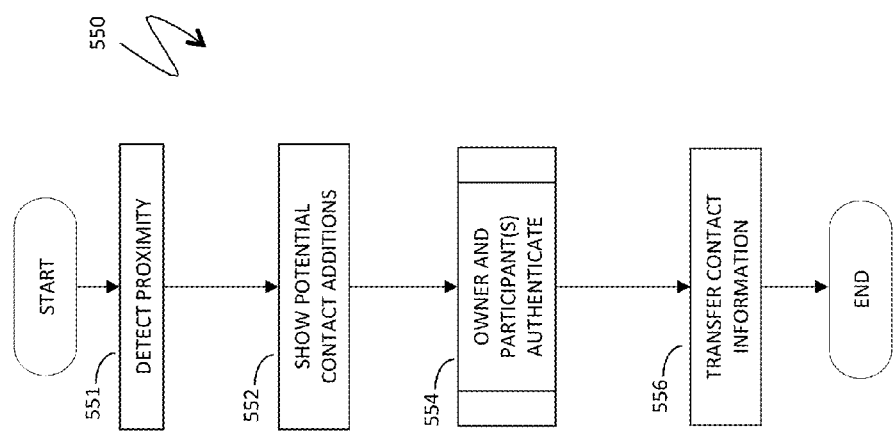

Referring to FIG. 5B, a flow diagram 550 illustrates in more detail processing performed at the step 524, discussed above, where an owner automatically obtains contact information from one or more participant(s). At a step 551, the mobile device of the owner detects the location of the mobile device(s) of the participant(s) (in case the mobile devices are location-aware) and determines if the mobile devices are in sufficient mutual proximity. In some instances, the mobile devices may be too far apart, in which case it may not be possible to obtain or exchange contact information. For devices that are in sufficient proximity, processing proceeds to a step 552 where the system analyzes personal contact spaces of the owner and qualifying participant(s) (i.e., participant(s) having devices in close enough proximity to communicate with the owner). At the step 551, the device that may be receiving contact information may also determine which of the available contacts are missing from the owner's personal contact space and may display lists of potential contact additions to the owner and also possibly to each qualifying participant. Subsequently, the owner and the qualifying participant(s) may each choose one or more contacts to obtain information from on the list displayed by the system. That is, the owner and/or the participants may select from the list of potential contacts (i.e., from those in proximity) a subset of contacts from which information will be received. After the step 552, processing proceeds to a step 554 where the owner and the selected participant(s) mutually authenticate each other or otherwise approve the automatic transfer of contact information between their devices. Such authentication may include typing in common authentication key for numeric comparison or using other secure pairing methods between each pair of devices. It is also possible to establish connections between mobile devices with front facing cameras using visible light as explained elsewhere herein. After the step 554, processing proceeds to a step 556 where the system automatically transmits contact information between pairs or all authenticated devices using peer-to-peer or server-based techniques. The transfer may include sending contact info via authenticated NFC or Bluetooth connections, establishing and utilizing Wi-Fi connections when devices are on common wireless network, sending information via email simultaneously from each contact to all selected and authenticated participants, authorizing access to temporary or permanent web page where contact information of a participant is stored, etc. It is also possible to transmit a location of the page with contact information as a shortened URL or contact information itself using decorated audio sequences is explained in more details elsewhere herein. Following the step 556, processing is complete.

Referring to FIG. 5C, a flow chart 560 illustrates processing performed at the step 540 of the flow chart 500 of FIG. 5A, described above, where virtual encounters are handled. Processing begins at a test step 565 where it is determined if the virtual encounter is via email (e.g., the owner receives an email message from one of the participants). If it is determined at the test step 570 that the virtual encounter is not via email, then processing proceeds to a step 570 where the owner requests full contact information from some or all participants. After the step 570, processing proceeds to a step 572 where the participant(s) send to the owner (and possibly also receive from the owner) full contact information in the formats of v-cards, text, etc. transmitted via email, file transfer methods, by exchanging links to page location of contact information or any other appropriate mechanism. After the step 572, processing proceeds to a step 574 where full contact information is entered into appropriate contact forms and added to the encounter and subsequently to updated personal contact space. Following the step 574, processing is complete.

If it is determined at the test step 565 that the virtual encounter is via email, then control transfers from the step 565 to a step 580 where the system extracts contact information from the email correspondence of the participant(s). After the step 580, processing proceeds to a step 582 where the system submits the extracted information to one or more social networking sites to retrieve additional contact information in a manner similar to the mechanism described herein. After the step 582, processing proceeds to a step 584 where the additional contact information is added to the personal contact space of the owner. Following the step 584, processing is complete. It should be noted that the contact information arriving via email may also be complete and therefore the step 584 may follow directly after the test step 565.

Capturing facial photos of contacts facilitates building the personal contact space and can also facilitate capturing contact information. The system described herein allows capturing different photos of each contact for multiple encounters. The quality of a facial photo depends, among other factors, on a camera position and angle. For most people, the best result is achieved when the camera is held slightly above the face and tilted downwards. It should be noted that many models of modern smartphones have a gyroscopic or other auto-detection system which allows measuring device tilt. Accordingly, the system described herein may use tilt detectors to optimize camera angle.

In an embodiment of the system described herein, the owner passes a mobile device with a front-facing camera to a new contact and asks the new contact to take a facial photo of himself or herself. The new contact holds the mobile device and looks at the screen thereof. Phone tilt is detected and defines the camera angle for an axis that is orthogonal to a phone surface (camera surface) and centered in the middle of a face of a contact. A photo capturing feature of the system monitors the tilt and recommends raising the camera if the camera is held too low and the axis orthogonal to the phone screen is pointing incorrectly (not at the subject). After the subject has lifted the phone sufficiently and the angle is right, the system recommends taking the photo.

Figure 6:
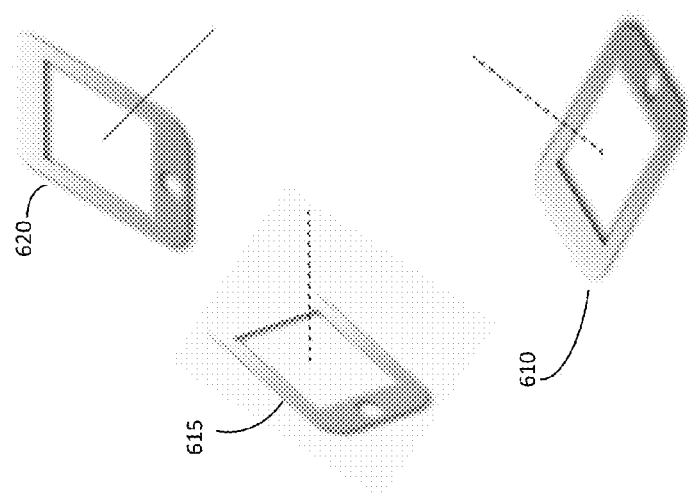
FIG. 6 is a schematic illustration of optimizing camera angle for taking by contacts of their own facial photos according to an embodiment of the system described herein.

Referring to FIG. 6, is a schematic illustration 600 shows different camera phone positions (i.e., camera-equipped smartphone positions). A first camera position 610 illustrates an upward direction of the axis detected by the phone indicating a wrong tilt. In such a case, an appropriate warning is displayed to instruct the participant to tilt the camera downward. A second camera position 615 illustrates a horizontal direction of the axis detected by the phone indicate wrong position. In this case, an appropriate warning is displayed to instruct the participant to move the camera further to counteract the incorrect horizontal position. Once the camera is raised and turned to a proper position 620 where the angle and position of the camera are optimal, a message is provided to the participant to take a photo.

Figure 7A:
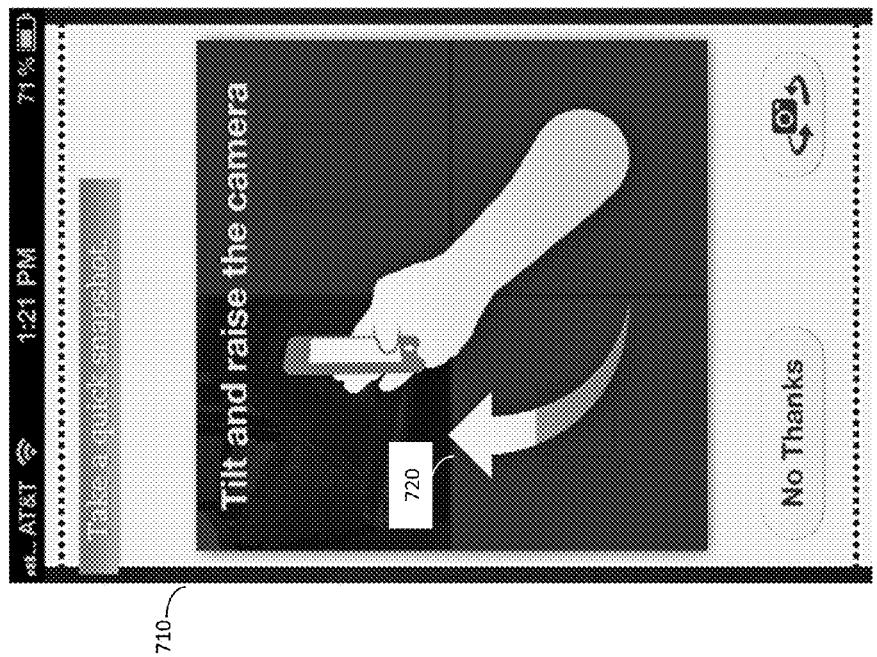
FIGS. 7A-7B illustrate an instructional user interface displayed during optimizing camera angle for taking by contacts of their own facial photos according to an embodiment of the system described herein.
Figure 7B:
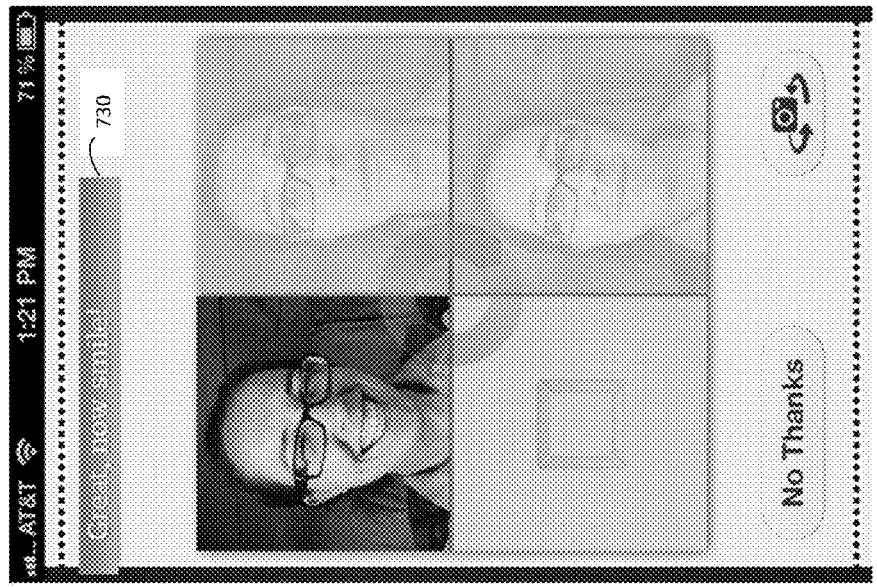

FIGS. 7A and 7B illustrate a user interface (UI) and messaging when a participant takes a photograph of himself or herself using a camera of an owner. The camera (smart phone) may monitor camera angle and calculate a difference in angular coordinates between the current camera angle and position and an optimal camera angle and position. An instructional portion 710 of the UI displays a partially filled arrow 720, which illustrates a deviation of a current angle from an optimum angle on a relative scale that ranges from the worst possible angle and position for a facial photo (the camera is held horizontally and an axis of the camera points vertically upwards) to the optimal angle and position. The participant may take a photograph irrespective of the angle and position of the camera, but is nonetheless prompted to tilt and raise the camera to an optimal angle and position. Once the camera is at or near the desired optimal angle and position, the message is changed to the invitation 730 that provides: "Great, now smile".

In an embodiment herein, an owner can view the personal contact space in two different modes: the contact ("mosaic") view and the profile view. The contact view mode displays thumbnails of contact photos in different sizes depending on an amount of information available for a particular contact. The more information that is available, the larger is the size of thumbnail. Thumbnails may be displayed in reverse chronological order of encounters, reminding the owner about all contacts met within a particular month. Accordingly, one and the same contact may appear in the contact view several times. Moreover, since contact photos are related to encounters, re-capturing photos of the same contact may occur and hence different photos of the same contact may be presented in the contact view. Regular date marks in the contact view are small date boxes indicating month and year. Additional date and location marks may be automatically generated by the system in connection with discovering a grouping of encounters in which a significant number of contacts participate in several encounters within a relatively short timeframe and at the same location. This may occur in connection with a conference or a trade show, in which case the system may display a starting month and location of such a group of encounters in a larger box to create another visual clue.

FIGS. 8A-8C illustrate a contact view UI for a personal contact space of an owner exemplified by the Evernote Hello system. The contact information of the owner and corresponding system settings are presented on a snapshot view 810. A first contact view snapshot 820 includes both small thumbnails 822 and large thumbnails 824. Date stamps on the snapshot 820 may be configured as monthly boxes 828. In contrast, a second contact view snapshot 830 includes both small date panes 832 and large event-related panes 834 and 836. A size of a thumbnail may depend on an amount of contact information and content available for a contact. Similarly, dates of encounters may be displayed in boxes of different sizes.

A profile view shows contact profiles, each represented by a summary and a timeline of encounters built for a particular contact. The profile view is not necessarily limited to facial contact photos and may display different types of materials associated with encounters. Referring to FIG. 9, an illustration 900 of a profile view for a particular contact includes a summary portion 910 having a contact information pane 920 with a contact photo, name and additional information available upon pressing on the email-phone-other buttons in the information pane. The summary portion 910 also includes a list of associated contacts 930 (see also, for example, the contacts 190 in FIG. 1). Below the summary portion 910 is a reverse chronological list of encounters 940, illustrated by a most recent encounter 950 in the contact profile. An encounter displays date 960 and encounter location 970, along with associated contacts 980 who have participated in the corresponding encounter. Additionally, a profile view of the most recent encounter 950 may include several units of associated materials 990, for example, a group photo, a handwritten note, and a link to related Evernote notes, all taken during the encounter. Earlier encounters may be available by scrolling down the encounter list. Transmitting contact information between mobile devices of an owner of a personal contact space and other participants of an in-person encounter may involve publishing of contact information of each individual from an online copy of personal contact space or other online service (for example, Evernote or Dropbox) and sharing contact information via a secure Web page. In an embodiment of the system described herein, locations (URLs) of such contact Web pages may be communicated via a URL shortening mechanism that may be used with a decorated audio sequences, i.e. encoded musical tunes.

The system described herein transmits small amounts of textual data such as shortened URLs and/or possibly directly transmits contact info via a brief decorated audio sequences where a background melody is mixed with accompanying chords which represent transmitted data. It is also possible to include additional filler chords serving decorative purpose, and auxiliary data. In the context of encounters, transmitting and receiving entities are mobile devices of participants of an encounter. In other systems, such as promotional broadcasts, transmitting entities may be public or corporate broadcast stations, delivering promotions via Web pages of customers. It is also possible to have the sending entities be mobile devices while one or more receiving entities can include a desktop or laptop computers, a specialized reader, a special purpose electronic device, such as an mp3 player or a cell phone, etc.

In an embodiment of the system described herein, a sender encodes transmitted data into chords and plays the chords as part of a brief tune. A receiving entity may be any in-range device with microphones or other audio reception capabilities, including mobile phone and tablet, which runs decoding and interpreting software. The receiving entity identifies, records, and decodes audio sequences and may store deciphered data and use the data accordingly. Decorated audio sequences created by the system may transmit to recipient(s) a reference to published data in the form of Web address of the target page represented as a shortened URL. Subsequently, devices used by one or more of the receiving entities decode the audio sequence and obtain access to the page.

In an embodiment, the system may be paired with an online URL shortening service, which performs traditional functions of such services by storing full page location(s) in a database and encoding an associated number or code generated by the database management software, such as auto-increment key in MySQL. The encoding results in a shortened URL key and may use conventional techniques, for instance, base 62 ("A-Z", "a-z", "0-9") or base 36 ("a-z", "0-9") encoding. The system may associate the shortened URL key with the full URL and provides a Web page redirection service to transform the shortened URL to a full URL with appropriate error processing.

A sender obtains the shortened URL for the target Web page and submits the shortened URL to the system. The system may then encode the shortened URL acoustically, as explained in more detail elsewhere herein. Such encoding may result in a brief tune that uniquely corresponds to the shortened URL. The tune may be used to communicate the target page reference to the decoding software running on a mobile device of a recipient. Subsequently, a broadcaster (sender, transmitter) replays the tune to an audience at appropriate times. In a scenario of transmitting contact information during a live encounter, tunes may be played at a start of a transmission session and may be paired with mutual authentication of participant devices. Any listener (recipient) of the tune who has a qualifying device with decoding software is technically capable of identifying, recording, decoding and storing the shortened URL on the device, which may be actuated and used to access the materials on a target web page. In some cases, decoding may be allowed only for authenticated recipient devices.

The above usage scenario has several characteristic features:
(1) Online URL shortening service is a supplement to the system.
(2) Encoded tunes may be very concise, in spite of encoding redundancy, introduced for decorating purpose, as explained in more details elsewhere herein. Such brevity may occur because even with base 36 coding, a 15-character shortened URL key is capable of encoding over 200 sextillion different Web page addresses, which is more than sufficient for any practical purpose, even taking into account encoding specifics that reduce the number of available combinations.

Encoding shortened URLs keys and other data creates decorated audio sequences (tunes) using harmonic encoding where encoded data bytes are represented by chords, which are mixed with filler chords serving decorative purpose and with delimiter chords separating data-carrying chords from decorative filler chords and different parts of a tune from each other. The sequence of chords, in its turn, may be played as an accompaniment to a foreground melodic sequence (core melody). Overall, each tune is designed to sound like an aesthetically pleasing piece of music in certain genre. As such, the tune may follow known rules of algorithmic composition. In one embodiment, Markov models of different orders may be employed to represent available chord progressions in a tune.

According to the proposed system, the structure, features and process of creating a tune are as follows:

1. Each tune is built within a certain music genre, such as blues, classical, anime, etc. A genre may be randomly chosen by the encoding application from a pre-defined set. The list of possible genres may be customized (narrowed) by a participant of an encounter who is looking to create the tune for transferring contact information. Alternatively, the tune may be directly chosen by the participant for entertainment or other purpose from an initial set of possible tunes.
2. Every genre may have a corresponding set of core melodies and a corresponding set of genre-specific accompanying chords. For example, tunes composed in the Jazz genre may use progressions of blue note chords while chords for the Baroque music may be limited to traditional triads.
3. Similarly to genres, a core melody for a particular tune may be randomly chosen by the encoding application from a pre-defined set of melodies available for that genre or the melody may be directly chosen by the participant looking to transmit contact information.
4. Available chord sequences may be extracted from actual pieces of music in each genre.
5. A chord alphabet for data encoding in a particular genre may be built as follows:
   a. A data encoding base (36, 62, etc.) is compared with a number of available chords extracted per #4. There may be dozens to hundreds of chords in the raw pitch class format. Additionally, 5-10 chords may be reserved as delimiter chords, as explained in more detail elsewhere herein. For example, if base 62 coding is used for the shortened URL keys then a minimum of 67-72 different chords (or possibly more) may be extracted from tunes in a given genre for encoding data symbols by single chords.
   b. If the number of chords is sufficient for encoding data bytes and delimiters, then, for each chord, a first order transition matrix is built, corresponding to the Markov model of chord progressions in music corpuses for that genre. The Markov model includes probabilities of transition from one chord to another, estimated statistically from actual tunes.
   c. If the number of chords that may succeed each individual chord in the transition matrix is still greater than the length of coding base (plus the number of delimiter chords) then individual chords and the first order transition matrixes thereof are used for encoding.
   d. Otherwise, a second order transition matrix may be built, so that the alphabet for encoding includes couples of adjacent chords that occur in the music corpus representing the selected genre. If necessary, third and higher order transition matrices are also possible.
6. Every tune may include three or four parts, as follows:
   Part 1. Introduction.
   Part 2. Data fragment.
   Part 3. Checksum.
   Part 4. [optional] Conclusion.
7. Each tune may include three types of chords—two of the types may be mandatory and one type may be optional:
   a. Data encoding chords.
   b. Filler chords added for decorative (harmonic) purpose—optional.
   c. Delimiter chords marking beginnings and ends of each decorative sequence of chords and the end of each part of the tune (except the final part) as explained below.
8. Each of Parts 1-3 defined in item 6 may be either a continuous sequence of data encoding chords or may be a mix of data encoding chords and filler chords. In some cases, if filler chords are included, then each sub-sequence of filler chords may start and end with a delimiter chord.

Specifically, parts 1-3 may have the following designation:

Part 1, Introduction, encodes a selected music genre, which also defines the set of available chords and chord progressions stored in both encoding and decoding applications, usage scenario, such as broadcast or peer-to-peer, and presence of absence of data encryption in the main fragment. In some cases, the musical genre may be encoded using the first chord to indicate the particular genre. Of course, other techniques may be used to indicate the particular genre. Optionally, it is possible to also encode other general data for the tune, such as coding page, number of data encoding chords in each of the three data-carrying sections for additional verification purpose, transmitter ID, etc.

Part 2, Main Data fragment, includes actual encoded data, such as subsequent symbols in a shortened URL key or bytes of personal contact data (name, email, etc.).

Part 3, Checksum, contains encoded data for the checksum of the Introduction and the Main Data fragment (or just the Main Data fragment) for verification purpose.

Part 4, Conclusion, may be added for a harmonic purpose, such as cadence resolution of a tune, and does not contain encoded data.

The Introduction may be separated from the Main Data fragment by Introduction Delimiter Chords. Similarly, the Main Data fragment may be separated from the Checksum and the Checksum from the Conclusion (if the latter exists) by other delimiter chords. Groups of delimiter chords for each part, as well as for separating decorative sequences, may all be non-overlapping to secure unique identification of each part. For the same reason, delimiter chords may not intersect with data coding and decorative chords. However, data coding and decorative chords may be the same, since the function of each depends on location in the tune, as indicated by delimiter chords.

9. The process of building a tune includes the following:
   a. All data in the Introduction, Main fragment, and Checksum are encoded, symbol by symbol, using an appropriate chord alphabet for the selected music genre, as explained above. Parts of the tune may be separated by delimiter chords.
   b. Consistency of a tune is tested by calculating probability of the progression as a Markov process and comparing the calculated value with an average probability of chord progressions of the same length in the corpus of tunes chosen for the given genre. Higher probability speaks in favor of consistency while probability significantly below the average indicates an inconsistent tune.

c. If the tune has low consistency, filler chords may be added to harmonize the tune. Each harmonizing subsequence may be separated from preceding and succeeding data encoding chords by best fitting delimiters. The sequence of filling chords may be selected to maximize the probability of the corresponding trajectory of the Markov process with state probabilities progressing in accordance with the transition matrix, as explained above.

d. Optionally, a final cadence may be added to the tune for harmonic resolution.

e. The resulting chord progression may be synchronized with the core melody chosen for the tune (see above) if the latter is present.

Data may be extracted from tunes by decoding applications, capable of recognizing chords and analyzing information presented as set forth above.

Figure 10:
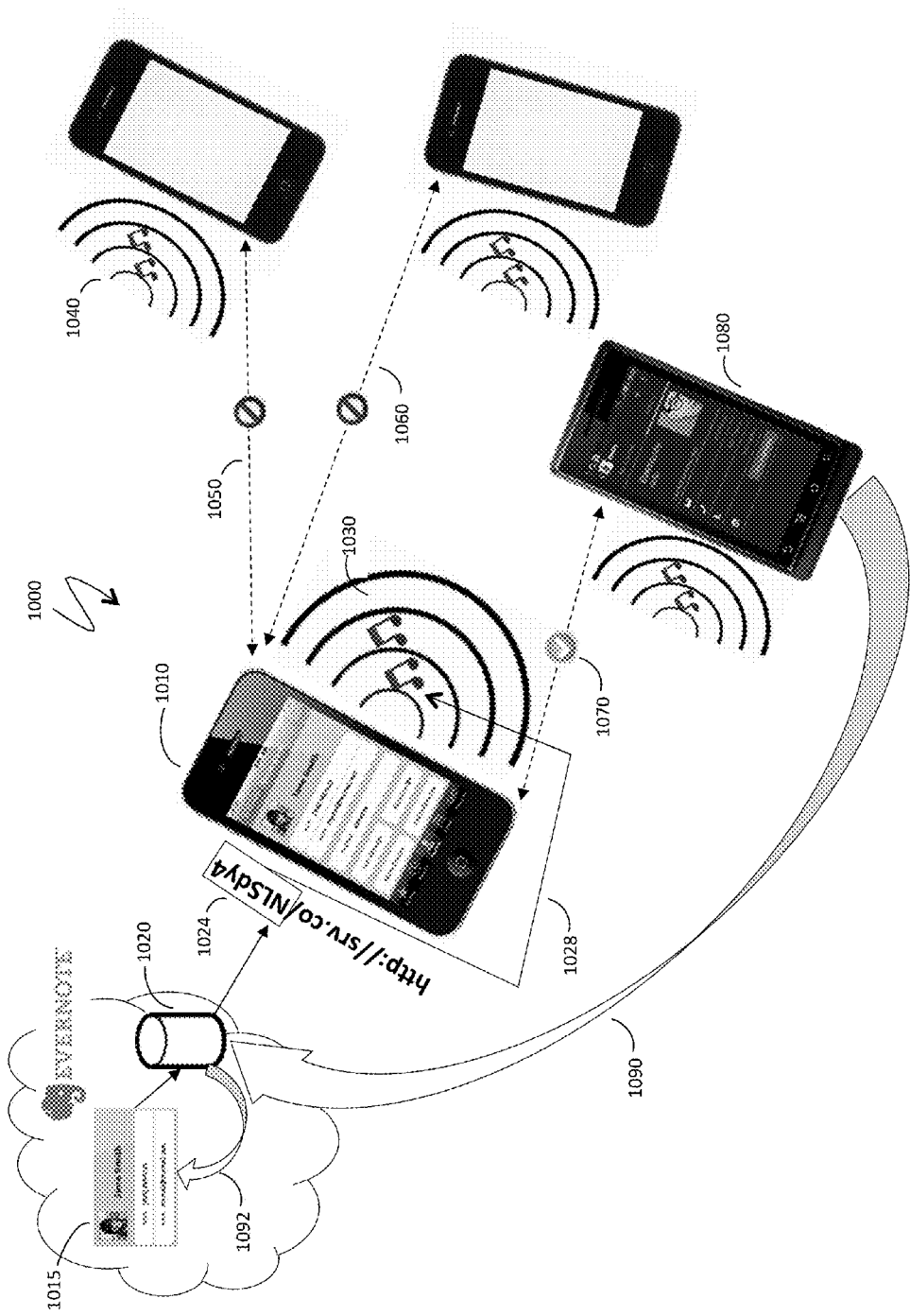
FIG. 10 is a schematic illustration of an audio transmission of selectively accessible contact information using encoded and decorated audio sequences according to an embodiment of the system described herein.

Referring to FIG. 10, a schematic illustration 1000 of audio transmission of selectively accessible contact information is shown. An encounter participant with a mobile device 1010, having contact information stored online, allows authorized access to the contact information via a Web page 1015. A full URL is submitted to a URL shortening service 1020, which creates a redirection record containing the original page URL and a shortened instance 1024 of the full URL. The system then uses acoustic encoding 1028 of the shortened URL key to create a decorated audio sequence 1030, which is subsequently broadcasted by the mobile device 1010 of the participant to nearby mobile devices that receive and record the tune as illustrated by an item 1040. However, decoding the tune may require device authentication and sender permission which may succeed, as illustrated by 1070, or fail for an authentication reason 1050 or because the sender does not authorize transmitting contact information even to an authenticated user 1060. Recipient mobile devices of authenticated and authorized users 1080 may decode the tune and access the shortened URL (1090) at the URL shortening service, which subsequently redirects a receiving mobile device (1092) to a target page to retrieve contact information of a sender.

It should be noted that an individual may maintain contact information available online and may possibly change the URL corresponding to the online contact information which may also change the corresponding shortened URL key. In a case where contact information is maintained online and the URL and shortened URL do not change, the individual does not need to produce encoding tunes on the fly and may prepare and store such tunes only when the full URL and the corresponding shortened URL change. Note that an individual may encode the same information (e.g., shortened URL) using tunes in different genres, taking additional care about aesthetical quality of encoding tunes and broadcasting a tune that better fits an audience of each encounter.

Figure 11:
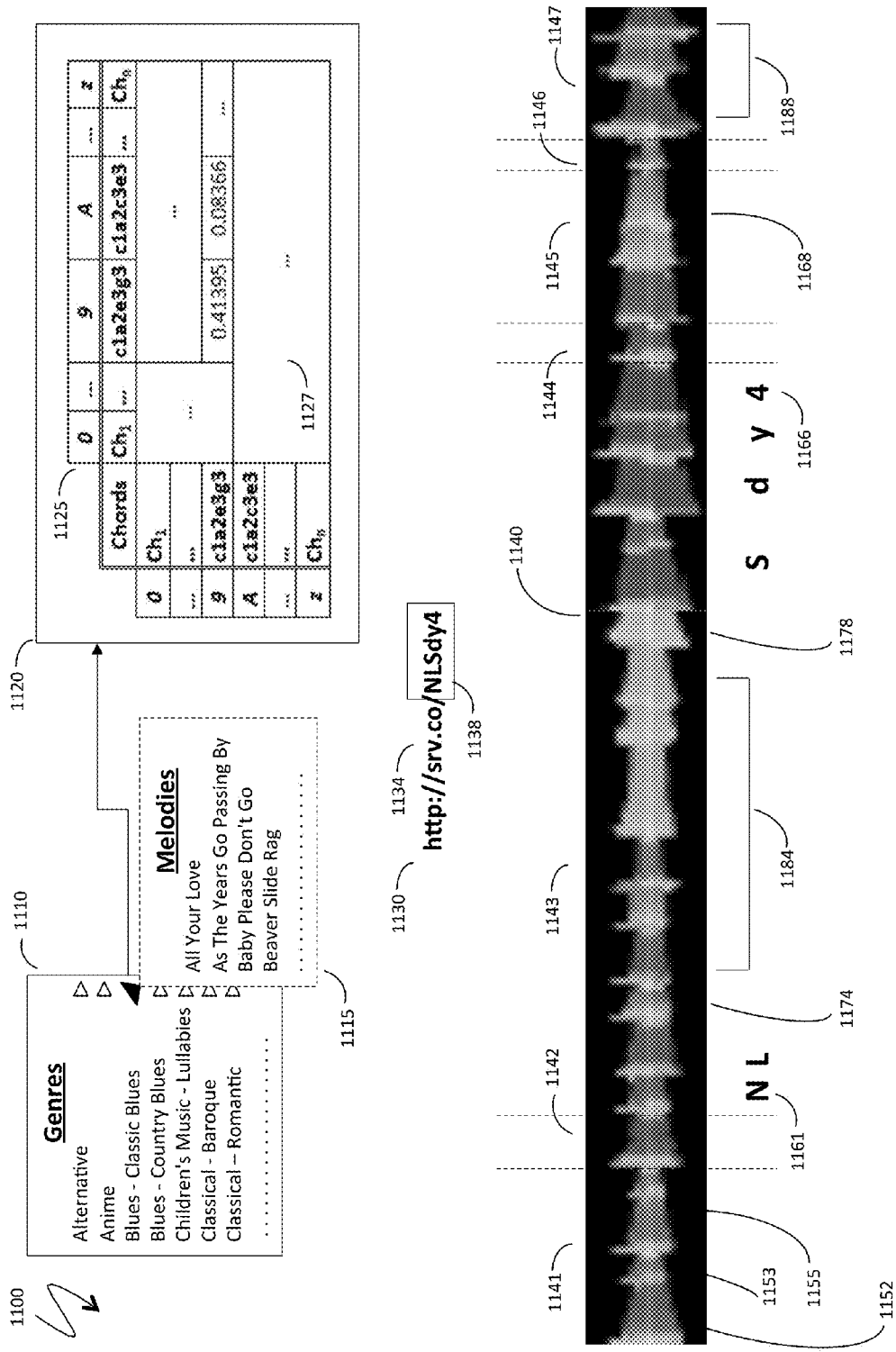
FIG. 11 is a schematic illustration of the method of building decorated audio sequences to encode shortened URL keys according to an embodiment of the system described herein.

FIG. 11 is a schematic illustration 1100 of tune construction for encoding a shortened URL for the contact page discussed above. A list 1110 of available genres, partially displayed on FIG. 11, may be augmented with a list 1115 of melodies for each genre, illustrated for a particular example of Classic Blues. A transition matrix 1120 of the corresponding first order Markov process for the Classic Blues genre includes a chord alphabet 1125 where each chord corresponds, in this embodiment, to a certain symbol in base 62 encoding. Of course, other possible encodings are possible. Numeric values of transitional probabilities 1127 in the body of the matrix and two particular blues chords shown in FIG. 11 are presented in[1] J.-F. Paiement, D. Eck and S. Bengio, "A Probabilistic Model for Chord Progressions", Proceedings of International Conference on Music Information Retrieval, 2005.

An encoded shortened URL 1130 includes a location 1134 of the URL shortening service, which may be part of personal contact space of a user and which may not need encoding, and a unique short URL key 1138, which addresses, through the URL shortening service, the original contact page. Acoustic encoding is provided for the shortened URL. The corresponding decorated audio sequence of chords 1140 in the Classic Blues genre includes four parts, as explained elsewhere herein, namely, an Introduction 1141, a Main Data Fragment 1143, a Checksum fragment 1145, and a Conclusion 1147, separated by part delimiter chords 1142, 1144, 1146. The Introduction 1141 includes three chords 1152, 1153, 1155 which encode, respectively, the genre (Classic Blues), a usage code (e.g., the tune is used to encode shortened URL key), and an encryption flag (e.g., no additional encryption in this case). The Main Data fragment 1143 includes chords that encode data bytes of the shortened URL key: "N"—1161 to "4"—1166, as indicated by symbols below the chords, mixed with a decorative sequence of filler chords 1184, separated from data encoding chords by two delimiters 1174, 1178. The Checksum fragment 1145 may be another sequence of data encoding chords 1168, while the Conclusion 1147 may be a purely decorative sequence of filler chords 1188 added for harmonic purpose and not containing any data encoding chords.

Figure 12A:
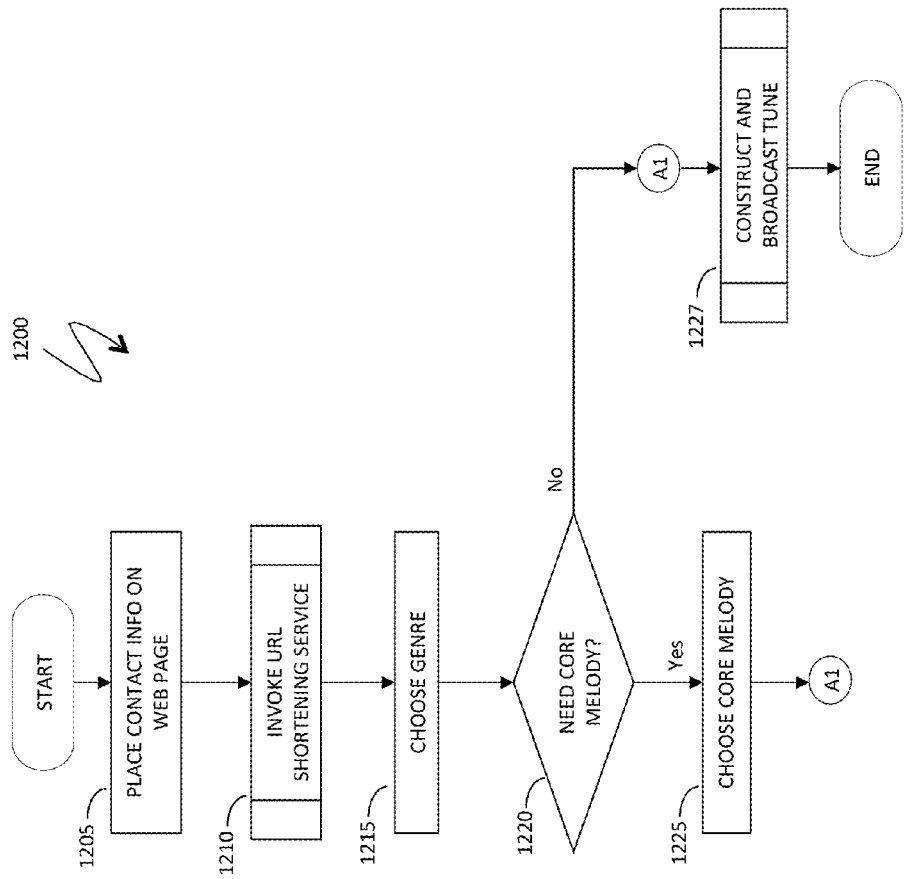
FIGS. 12A-12B are flow diagrams showing creation and decoding of decorated audio sequences for transmitting shortened URL keys according to an embodiment of the system described herein.

FIG. 12A is a flow diagram 1200 illustrating creating and exchanging contact information via decorated audio sequences. Processing starts at a step 1205 where a participant provides online contact information via a (possibly) secure Web page. After the step 1205, processing proceeds to a step 1210 where the original URL of the page is submitted to the dedicated URL shortening service, which creates a database record and sends to the participant a shortened URL key (e.g., 6-15 characters in base 62 encoding). After the step 1210, processing proceeds to a step 1215 where a music genre for encoding the tune is chosen, either automatically or manually. After the step 1215, processing proceeds to a test step 1220 where it is determined whether the user wants to supply the tune with a core melody. If the answer is positive, processing proceeds to a step 1225 where a core melody for the tune is chosen automatically or manually. In an embodiment described herein, the presence of a core melody is a user choice. Following the step 1225, processing proceeds to a step 1227 where the tune is constructed and broadcast. Processing performed at the step 1227 is discussed in more detail elsewhere herein. The step 1227 is also reached directly from the test step 1220, described above, if it is determined at the test step 1220 that it is not necessary to select a core melody.

Figure 12B:
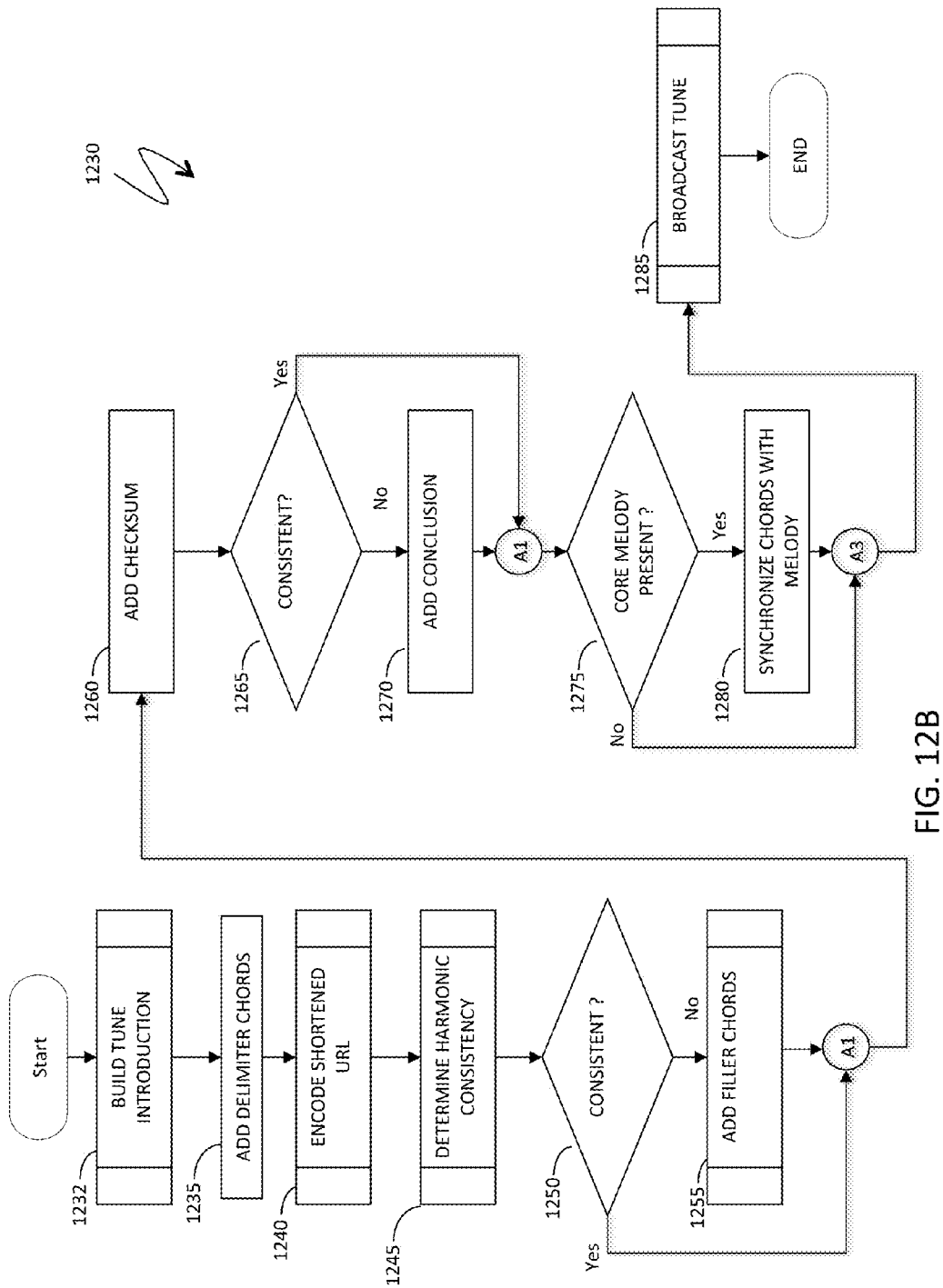

Referring to FIG. 12B, a flow diagram 1230 illustrates in more detail processing performed at the step 1227, described above, where a tune is constructed and broadcast. Processing begins at a first step 1232 where the tune Introduction is built by encoding genre, melody (optionally), encryption option, etc. in the chord alphabet corresponding to the chosen genre, as described above. After the step 1232, processing proceeds to a step 1235 where an Introduction Delimiter Chord is chosen among available candidates to separate the tune Introduction from the Main Data segment and best fit the final chords of the Introduction. After the step 1235, processing proceeds to a step 1240 where a draft version of the Main Data segment is built by encoding the shortened URL, symbol by symbol, in the chord alphabet representing the chosen genre. After the step 1240, processing proceeds to a step 1245 where harmonic consistency of the chord sequence is calculated as explained above. After the step 1245, processing proceeds to a test step 1250 where it is determined whether the draft audio sequence is consistent. In case of negative answer, processing proceeds to a step 1255. Otherwise, processing proceeds to a step 1260. At the step 1255, optimal sub-sequences of filler chords are added to the Main Data fragment, along with preceding and succeeding chord delimiters, in order to increase consistency of the overall sequence, as described above. Following the step 1255, processing proceeds to the step 1260 where the Checksum fragment of chords is added to the sequence for the tune.

After the step 1260, processing proceeds to a text step 1265 where it is determined once again if the chord sequence, which now includes the Main Data fragment and the Checksum, is consistent. If the answer is positive, processing proceeds to a test step 1275. Otherwise, processing proceeds to a step 1270, when an optimal Conclusion is added to harmonize the overall sequence of chords, as described above. Following the step 1270, processing proceeds to the test step 1275 where it is determined whether a core melody for the tune is present. If positive, processing proceeds to a step 1280. Otherwise, creation of the tune is complete and processing proceeds to a step 1285 where the tune is broadcast. At the step 1280, the previously created sequence of chords is synchronized with the core melody, which completes building of the tune. Following the step 1280, processing proceeds to the step 1285. At the step 1285, the participant broadcasts the tune. Authenticated and authorized recipients may decipher the resulting shortened URL using decoding software, visit the respective page in the URL shortening service which instantly redirects visitors to the target secure page to obtain contact information of the participant. Following the step 1285, processing is complete.

Several techniques for capturing contact information described elsewhere herein may require or use mutual authentication of mobile devices during an in-person encounter prior to wireless transmission of contact information between the devices. There may be one or more of several communications technologies enabling such transmissions, such as Wi-Fi, Bluetooth, NFC, cellular and satellite wide area networks supporting server-based transmissions, etc. However, initiating data transmissions by establishing peer-to-peer connections between two mobile devices (handshaking) is useful (and sometimes required) for establishing secure communication. Conventionally, pairing between smartphones involves manual work with device settings or with user interfaces of third party software applications, which may be relatively difficult to use. In addition, in some cases a phone handshaking process lacks attractive features of social interaction; instead of bringing users together via visually appealing communications, phone handshaking leaves each of the users working on establishing a connection manually and looking at phone screen rather than at another person. Accordingly, it may be useful for the mobile social world to build a new generation of user interfaces (UIs), improving the handshake procedure for data transfer between smartphones. In some cases, when other communication mechanisms are not available or are overloaded, there may also be a need for additional data transmission capabilities between phones.

In one embodiment, connection between phones may be established using visible light emitted by phone screens and received by front-facing phone cameras. When other data transmission methods are not available, unreliable or overloaded, or otherwise not desired, the system described herein may also be used to transmit the actual data between phones. It should be noted that, due to proliferation of direct visual communications, such as videoconferencing, smartphones with front facing cameras are available. In an embodiment herein, actual data transfer may be conducted via wireless networks available on both phones. In another embodiment, the mobile phones use a Wi-Fi network and the hardware and software capabilities of the phones allow direct peer-to-peer data transfer supported by network features. In yet another embodiment, the phones may be equipped with Bluetooth or NFC connectivity hardware and software and may similarly discover peer devices and transfer data directly from one device to another. In another embodiment, the phones may reside on one or different wide area networks (WANs) and are connected to the Internet, which allows employing diverse Internet techniques to transfer data via peer-to-peer or server-client, such as, for example, different FTP programs. Irrespective of a particular data transfer technology, the system described herein uses encoded sequence of displayed images on phone screens to establish connection between phones and perform necessary operations before the actual data transfer starts. Note, however, that data may also be encoded and transmitted, with user approval, using visible light and cameras.

In an embodiment of the system described herein, both data sender and receiver launch data transfer software on their phones. The software on a first phone displays sequence of visual patterns on each phone screen representing, in an encoded form, various parameters necessary for establishing connection between phones. Sending the encoded visual patterns eliminates manual preparations of the phones for handshaking prior to data transmission. A second phone receives visual signals using a front facing camera thereof and the same software deciphers transmitted parameters and processes the parameters as necessary to establish communications. Software running on the second phone may in turn generate visual patterns to encode a response of the second phone back to the first phone, such as a confirmation or a request for additional information from the first phone. In different embodiments and depending on the types of wireless connectivity available on both phones, protocols, intermediate software applications controlling over data transfer, and procedures of establishing connections under such conditions, different sequences of user actions may be automated using visible light as a connectivity data transport. In an embodiment with Bluetooth connectivity using the Secure Simple Pairing (SSP) mechanism, visual patterns displayed by the devices and received by cameras thereof may correspond to a numeric code used in the authentication method based on a numeric comparison. The system may thus confirm, on behalf of device owners, authenticity of transmitted codes. In another embodiment with SSP mechanism, displayed patterns may transmit passcodes and establish SSP pairing during a similar procedure where a passcode is decoded from generated visual sequences by a front-facing camera of a phone. In yet another embodiment, encoded visual patterns may be used to create a link key stored in encrypted form on both phones that enables easy pairing and data transfer between the phones.

A useful aspect of a visual handshake between mobile phones is the potential aesthetical attractiveness to the participants. Even though a pair of sending and receiving phones may remain in close proximity and oriented face-to-face and therefore partially obstruct views of the screens thereof, displayed visual patterns and modulations thereof may still be visible, at least partially, not only to both phone owners but possibly to other nearby participants of an encounter. Accordingly, the ceremony of visual handshaking between mobile phones may be perceived as a social feature. In one embodiment, sequences of visual patterns used specifically for transmitting specific data for establishing connection between phones, such as numeric codes, passcodes, confirmations, information about available connection methods, etc. may be decorated with color, animation and other effects and/or blended into a short video clip. Designated visual patterns-markers may be employed to separate entertaining and informational context of such a clip in a manner similar to creation of decorated audio sequences as explained elsewhere herein. In another embodiment, a library of alternative visual patterns and sequencing methods may become available on each communicating phone and a user of a transmitting phone may choose a particular favorite item to use in communications. In yet another embodiment, a back-facing camera of a transmitting phone may capture and process images of a surrounding location where the data transmission is performed and choose complementary items from library (e.g., items having complementary color, theme, etc.).

Figure 13:
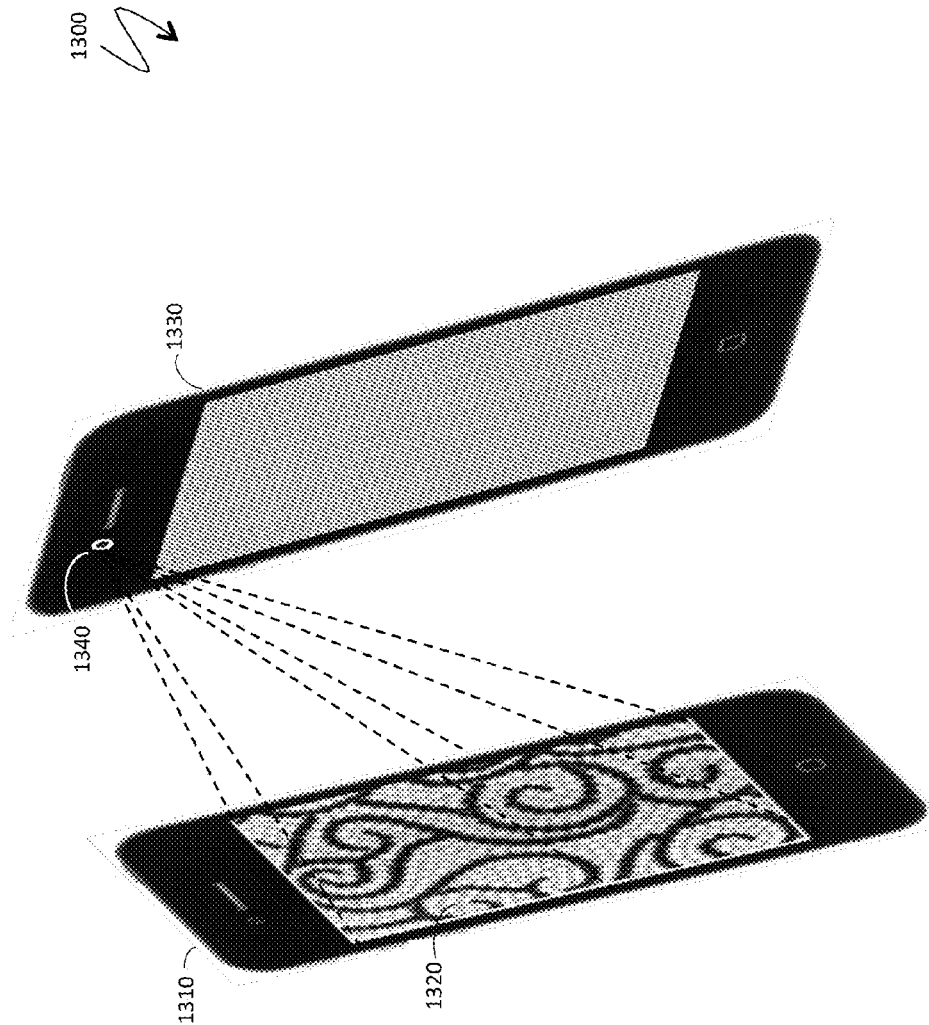
FIG. 13 is a schematic illustration of transmitting encoded visual pattern to a front-facing phone camera for subsequent decoding according to an embodiment of the system described herein.

Referring to FIG. 13, a schematic illustration 1300 shows transmitting encoded visual pattern from a sending phone to a recipient phone where both phones are supplied with front-facing cameras. Prior to transmission, the phone owners may arrange the screens of the phones to be face-to-face. Software running on a sending phone 1310 displays an image 1320 showing a visual pattern on a screen of the phone 1310, encoding certain symbol in a communication alphabet. Software running on a receiving phone 1330 captures the image 1320 using a front-facing camera 1340 of the phone 1330 and processes the image 1320 as necessary, decoding transmitted information.

Figure 14A:
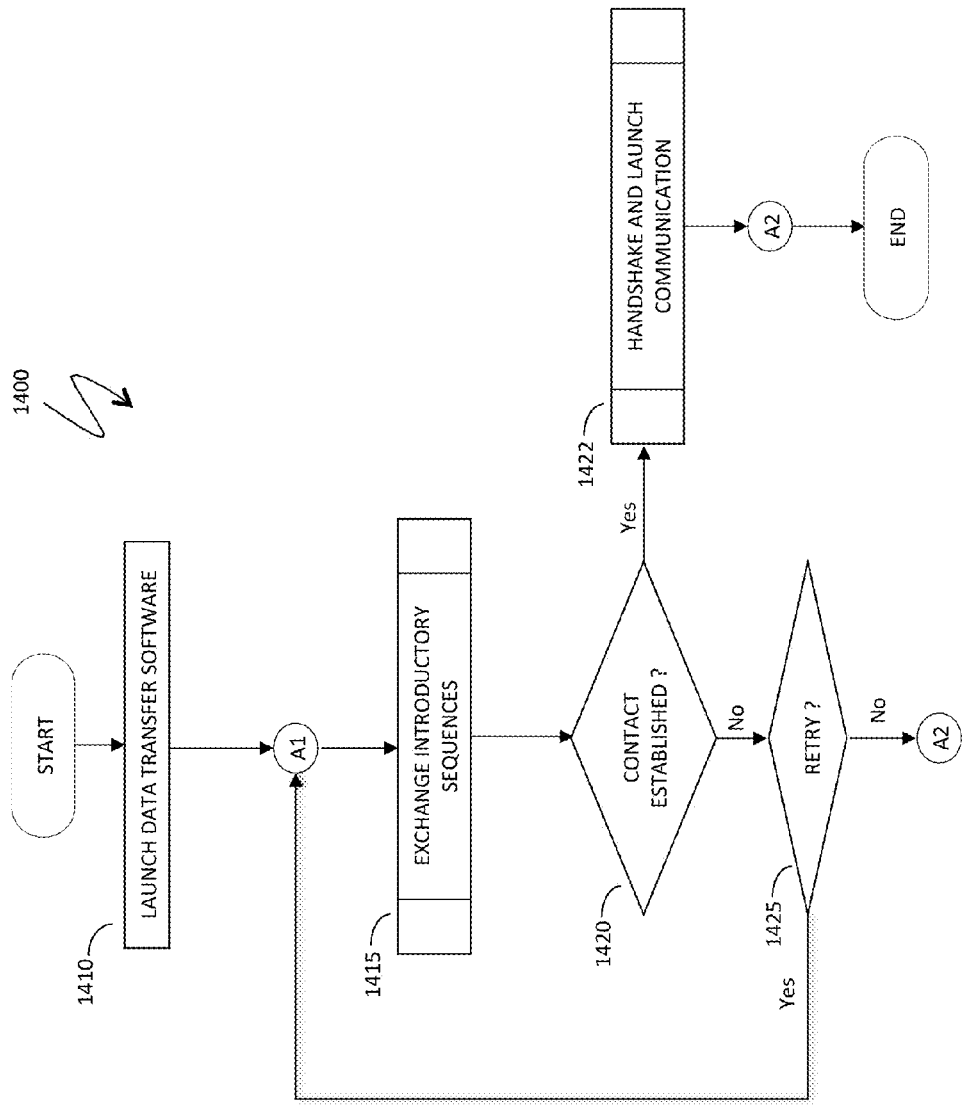
FIGS. 14A-14C are flow diagrams showing data transmission process between phones using visible light according to an embodiment of the system described herein.

Referring to FIG. 14A, a flow diagram 1400 illustrates processing performed in connection with data transmission between phones using visible light. Processing starts at a step 1410 where participants of an encounter each launch software on their mobile phones to facilitate visual handshaking and position the phones face-to-face. After the step 1410, processing proceeds to a step 1415 where software running on each of the phones generates and exchanges an introductory sequence of visual patterns to establish and verify visual contact between the phones. After the step 1415, processing proceeds to a test step 1420, where it is determined whether the attempt succeeded. If contact between the phones has been established and confirmed, processing proceeds to a step 1422, where the phones handshake and launch communication between the phones. Processing at the step 1422 is described in more detail elsewhere herein. Following the step 1422, processing is complete.

If it is determined at the test step 1420 that visual contact has not been established between the phones, then control transfers from the step 1420 to a test step 1425 where participants are offered to retry an attempt. If the participants agree to retry establishing communication at the step 1425, processing proceeds to the step 1415, described above, for another attempt. Otherwise, processing is complete.

Figure 14B:
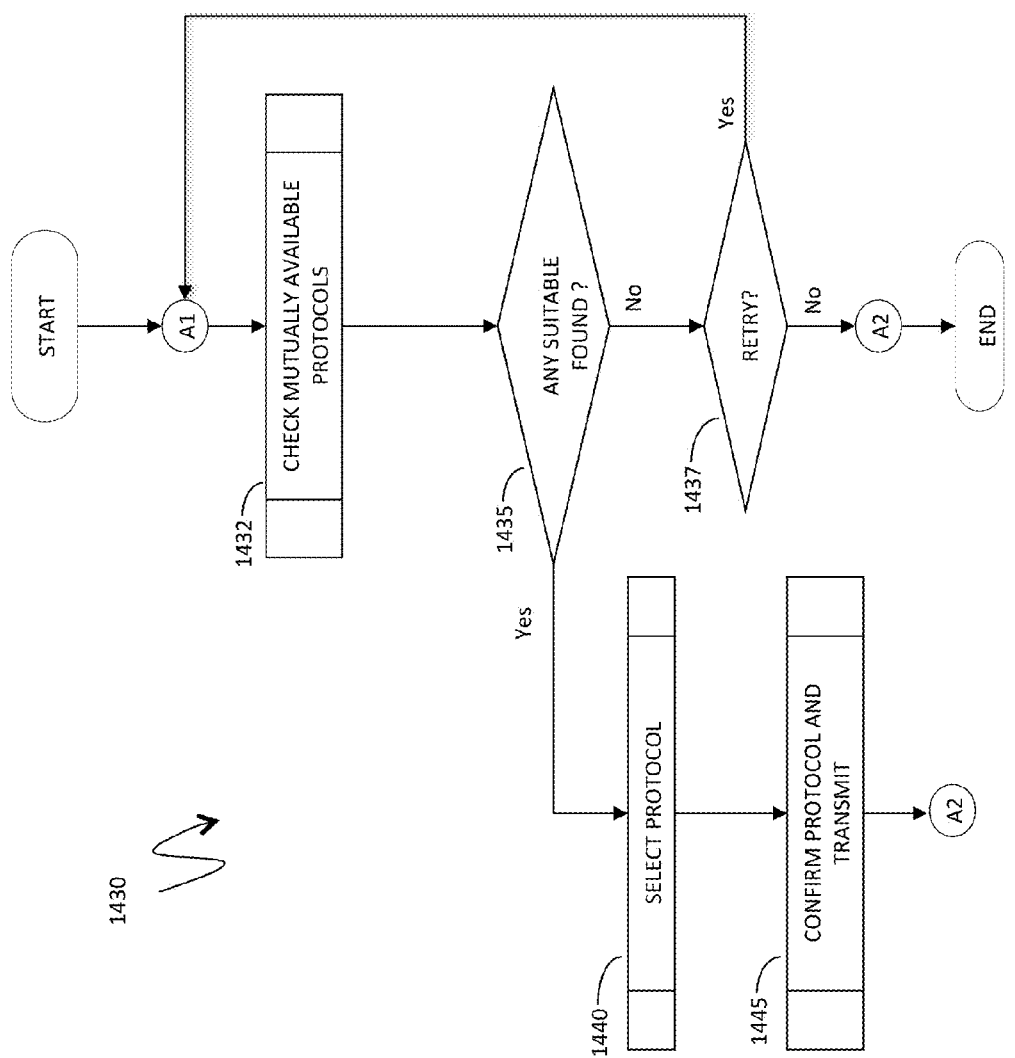

Referring to FIG. 14B, a flow diagram 1430 illustrates in more detail processing performed at the step 1422 where the phones handshake and launch communication therebetween. Processing begins at a first step 1432 where the phones generate and exchange encoded visual patterns to check mutually available data transmission protocols for the contact information, such as a common Wi-Fi network, Bluetooth, WAN connections to the Internet where contact information is published, as explained elsewhere herein, etc. After the step 1432, processing proceeds to a test step 1435 where it is determined whether a mutually available communications protocol has been found. If the answer is positive, control is transferred to a step 1440. Otherwise, control is transferred to a test step 1437 where participants are offered to retry an attempt. Note that, in response to an indication at the step 1437 that there are no mutually available protocols, users may enable additional connection capabilities, such as turning on Wi-Fi and/or Bluetooth connectivity which may have otherwise been disabled on the phones (e.g., for battery power conserving purposes) during the previous iteration. If the answer at the step 1437 is positive, processing proceeds to the previous step 1432, discussed above, for another iteration. Otherwise, processing is complete. At the step 1440, the phones choose an optimal or desired data transmission protocol. Following the step 1440, control transfers to a step 1445 where the protocol is confirmed and data transmission is initiated. Processing performed at the step 1445 is discussed in more detail elsewhere herein. Following the step 1445, processing is complete.

Figure 14C:
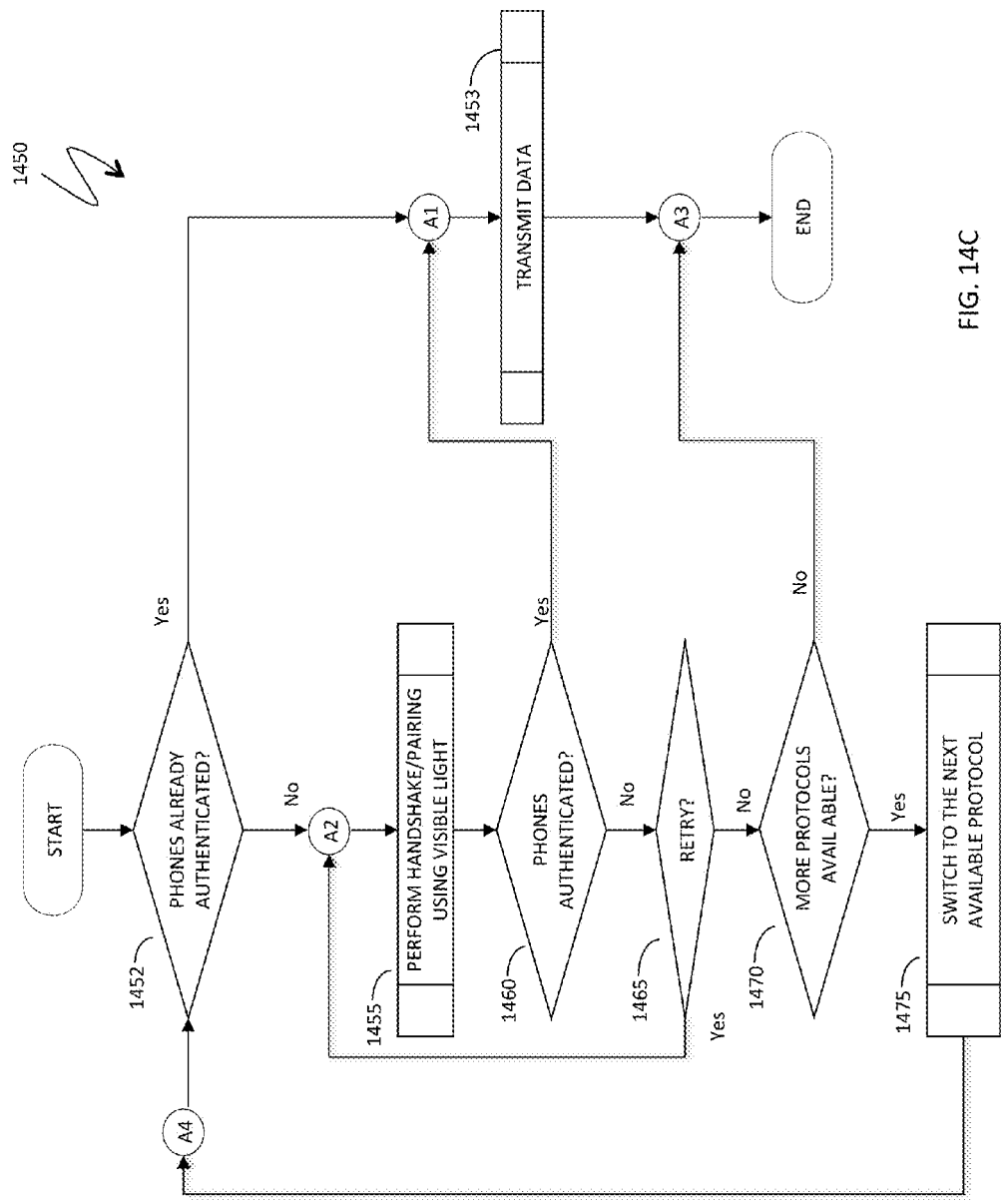

Referring to FIG. 14C, a flow diagram 1450 illustrates in more detail processing provided at the step 1445 where the transmission protocol is confirmed and then transmission is initiated. Processing begins at a first test step 1452 where the phones use visible light to exchange information between the phones to allow verifying if the two phones have been mutually authenticated in the past against the chosen transmission protocol, including a pre-defined handshake. In some cases, phones that have been authenticated in the past may retain authentication/handshake data for future use. If the verification at the step 1452 returns a positive result, the two phones are deemed mutually authenticated and the handshaking process is completed, in which case processing proceeds to a step 1453 to begin the actual data transfer between the phones. Note that the transfer protocol could be any appropriate technique, including Bluetooth, WiFi, or even sound or light communication, as described elsewhere herein. Following the step 1453, processing is complete.

If the verification at the step 1452 returns a negative result, then processing proceeds to a step 1455 where handshake/pairing procedure for the chosen data transmission method is performed using visible light. After the step 1455, processing proceeds to a test step 1460, which determines whether the two phones have been successfully paired at the step 1455. If the answer is positive, then, as previously, the phones are deemed paired and control is transferred to the step 1453 for the start of the actual data transfer, as described above. Otherwise, if it is determined at the test step 1460 that the phones are not yet authenticated, then processing proceeds to a test step 1465 where participants are offered to retry handshaking procedure. If the participants wish to retry the handshaking procedure, processing proceeds to the previous step 1455, discussed above, and another attempt of pairing the phones is performed. If participants do not want to retry, then pairing for the currently chosen transmission protocol is considered unsuccessful and processing proceeds to a test step 1470 where it is determined whether there exists more available transmission protocols that can be used between phones. If not, then processing is complete. Otherwise, control transfers from the test step 1470 to a step 1475 where both phones are switched to the next preferred data transmission protocol. Following the step 1475, processing proceeds back to the test step 1452 for another iteration.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of establishing a connection between mobile devices, comprising:
    arranging a first one of the mobile devices to display a sequence of images that are received by a second one of the mobile devices;
    the first one of the mobile devices displaying a first sequence of images that are received by the second one of the mobile devices;
    the second one of the mobile devices displaying a second sequence of images that are received by the first one of the mobile devices, wherein the first and second sequences of images establish contact between the mobile devices;
    retrying to establish contact between the mobile devices in response to at least one of: the second one of the mobile devices not decoding the first sequence of images and the first one of the mobile devices not decoding the second sequence of images;
    the mobile devices exchanging images to determine mutually available data transmission techniques following establishing contact between the mobile devices;
    choosing one of the mutually available data transmission techniques;
    the mobile devices exchanging images to pair the mobile devices in response to the mobile devices not being previously authenticated to use the one of the mutually available transmission techniques that is chosen; and
    transferring data between the mobile devices using the one of the mutually available transmission techniques that is chosen.

2. A method, according to claim 1, wherein the one of the mutually available transmission techniques that is chosen is one of: Bluetooth and Wi-Fi.

3. A method, according to claim 2, wherein the mobile devices exchanging images to pair the mobile devices includes providing images corresponding to numbers used in connection with a Secure Simple Pairing mechanism.

4. A method, according to claim 1, wherein the one of the mutually available transmission techniques that is chosen is exchanging and interpreting images encoded with data for transmission.

5. A method, according to claim 1, wherein, in response to the mobile devices not being able to be authenticated to use the one of the mutually available transmission techniques that is chosen, choosing a different one of the mutually available transmission techniques.

6. A method, according to claim 1, wherein arranging a first one of the mobile devices to display a sequence of images that are received by a second one of the mobile devices includes placing the mobile devices face to face and wherein the mobile devices have front facing cameras that receive images displayed on an opposing one of the devices.

7. A method, according to claim 1, wherein the sequences of images are made aesthetically attractive.

8. A method, according to claim 7, wherein aesthetic attractiveness of the sequences of images is enhanced by decorating the light signals with at least one of: color and animation.

9. A method, according to claim 8, wherein the sequences of images include at least one video clip.

10. A method, according to claim 1, wherein a user chooses a specific set of image sequences from a library of sets of images.

11. A method, according to claim 1, wherein the system captures and processes images of a place where data transmission is performed and chooses a corresponding set of image sequences from a library of sets of images.

12. Computer software, provided in a non-transitory computer-readable medium, that establishes a connection between mobile devices, the software comprising:
    executable code that causes a first one of the mobile devices to display a first sequence of images that are received by a second one of the mobile devices;
    executable code that causes a second one of the mobile devices to display a second sequence of images that are received by the first one of the mobile devices, wherein the first and second sequences of images establish contact between the mobile devices;
    executable code that retries to establish contact between the mobile devices in response to at least one of: the second one of the mobile devices not decoding the first sequence of images and the first one of the mobile devices not decoding the second sequence of images;
    executable code that causes the mobile devices to exchange images to determine mutually available data transmission techniques following establishing contact between the mobile devices;
    executable code that facilitates choosing one of the mutually available data transmission techniques;
    executable code that causes the mobile devices to exchange images to pair the mobile devices in response to the mobile devices not being previously authenticated to use the one of the mutually available transmission techniques that is chosen; and
    executable code that transfers data between the mobile devices using the one of the mutually available transmission techniques that is chosen.

13. Computer software, according to claim 12, wherein the one of the mutually available transmission techniques that is chosen is one of: Bluetooth and Wi-Fi.

14. Computer software, according to claim 13, wherein the mobile devices exchanging images to pair the mobile devices includes providing images corresponding to numbers used in connection with a Secure Simple Pairing mechanism.

15. Computer software, according to claim 12, wherein the one of the mutually available transmission techniques that is chosen is exchanging and interpreting images encoded with data for transmission.

16. Computer software, according to claim 12, wherein, in response to the mobile devices not being able to be authenticated to use the one of the mutually available transmission techniques that is chosen, a different one of the mutually available transmission techniques is chosen.

17. Computer software, according to claim 12, wherein the sequences of images are made aesthetically attractive.

18. Computer software, according to claim 17, wherein aesthetic attractiveness of the sequences of images is enhanced by decorating the light signals with at least one of: color and animation.

19. Computer software, according to claim 18, wherein the sequences of images include at least one video clip.

20. Computer software, according to claim 12, wherein the system captures and processes images of a place where data transmission is performed and chooses a corresponding set of image sequences from a library of sets of images.

* * * * *